United States Patent
Cevahir et al.

(10) Patent No.: US 9,940,366 B2
(45) Date of Patent: Apr. 10, 2018

(54) IMAGE SEARCH DEVICE, IMAGE SEARCH METHOD, PROGRAM, AND COMPUTER-READABLE STORAGE MEDIUM

(71) Applicant: Rakuten, Inc., Tokyo (JP)

(72) Inventors: Ali Cevahir, Tokyo (JP); Junji Torii, Chiba (JP)

(73) Assignee: RAKUTEN, INC., Tokyo (JP)

( * ) Notice: Subject to any disclaimer, the term of this patent is extended or adjusted under 35 U.S.C. 154(b) by 687 days.

(21) Appl. No.: 14/388,815

(22) PCT Filed: Mar. 29, 2013

(86) PCT No.: PCT/JP2013/059546
§ 371 (c)(1),
(2) Date: Sep. 29, 2014

(87) PCT Pub. No.: WO2013/147166
PCT Pub. Date: Oct. 3, 2013

(65) Prior Publication Data
US 2015/0066957 A1 Mar. 5, 2015

(30) Foreign Application Priority Data
Mar. 29, 2012 (JP) .................................. 2012-078343

(51) Int. Cl.
*G06F 17/30* (2006.01)

(52) U.S. Cl.
CPC .... *G06F 17/3053* (2013.01); *G06F 17/30247* (2013.01); *G06F 17/30271* (2013.01); *G06F 17/30277* (2013.01)

(58) Field of Classification Search
CPC ........... G06F 17/30277; G06F 17/3053; G06F 17/30271; G06F 17/30247
See application file for complete search history.

(56) References Cited

U.S. PATENT DOCUMENTS 4,344,134 A 8/1982 Barnes
4,742,552 A 5/1988 Andrews
(Continued)

FOREIGN PATENT DOCUMENTS

EP 2138957 A2 12/2009
JP H06-274548 A 9/1994
(Continued)

OTHER PUBLICATIONS

Md Mahmudur Rahman and Prabir Bhattacharya, "Image Retrieval with Automatic Query Expansion Based on Local Analysis in a Semantical Concept Feature Space", CIVR '09 Proceedings of the ACM International Conference on Image and Video Retrieval Article 20, Jul. 8-10, 2009, pp. 1-8.*

(Continued)

*Primary Examiner* — Cheryl Lewis
(74) *Attorney, Agent, or Firm* — Hubbs, Enatsky & Inoue PLLC

(57) ABSTRACT

An image search device is configured to: obtain a plurality of query feature vectors each indicating a local feature of an image serving as a query; select a plurality of image feature vectors respectively corresponding to the plurality of query feature vectors based on proximities between the plurality of image feature vectors respectively indicating a plurality of local features of each of a plurality of search target images to be searched, and the plurality of query feature vectors; generate an image score of the search target image based on a total sum of score elements each corresponding to the proximities between the selected plurality of image feature vectors and the query feature vectors corresponding to the selected image feature vectors; and select at least one of the plurality of search target images based on the image score.

19 Claims, 20 Drawing Sheets

(56) References Cited

U.S. PATENT DOCUMENTS

| | | | |
|---|---|---|---|
| 4,985,827 | A | 1/1991 | Hamanaka et al. |
| 5,253,308 | A | 10/1993 | Johnson |
| 6,134,541 | A | 10/2000 | Castelli et al. |
| 6,285,995 | B1 | 9/2001 | Abdel-Mottaleb et al. |
| 6,728,752 | B1 | 4/2004 | Chen et al. |
| 8,429,173 | B1 | 4/2013 | Rosenberg et al. |
| 9,043,316 | B1 * | 5/2015 | Murphy-Chutorian .. G06K 9/46 707/723 |
| 2004/0088521 | A1 | 5/2004 | Barlow et al. |
| 2007/0244925 | A1 | 10/2007 | Albouze |
| 2009/0097756 | A1 | 4/2009 | Kato |
| 2010/0318515 | A1 | 12/2010 | Ramanathan et al. |
| 2011/0158558 | A1 | 6/2011 | Zhao et al. |
| 2012/0143856 | A1 | 6/2012 | Klinkigt et al. |
| 2013/0121535 | A1 | 5/2013 | Matsukawa |

FOREIGN PATENT DOCUMENTS

| | | |
|---|---|---|
| JP | 2001-160070 A | 6/2001 |
| JP | 2005-234994 A | 9/2005 |
| JP | 2009-093563 A | 4/2009 |
| JP | 2010-250637 A | 11/2010 |
| JP | 2011-103082 A | 5/2011 |
| JP | 2011-107795 A | 6/2011 |
| JP | 2011-113197 A | 6/2011 |
| JP | 2012-033022 A | 2/2012 |
| WO | 2006/033257 A1 | 3/2006 |
| WO | 2009/060722 A1 | 5/2009 |
| WO | 2011/021605 A1 | 2/2011 |

OTHER PUBLICATIONS

International Search Report for relating PCT patent application No. PCT/JP2011/077149 dated Jan. 17, 2012.
A Parallel Implementation of Content-Based Image Retrieval: Final Project Report, by Fang & Anderson. In: U. Cincinnati, Dept. Comp. Sci. (Dec. 18, 2008). Available at: http://cs.uc.edu/~fangcg/course/CS668%20Final%20Project%20Report.pdf.
Accelerating Image Retrieval Using Factorial Correspondence Analysis on GPU, by Pham et al. In: Computer Analysis of Images and Patterns (Sep. 29, 2009). Available at: SpringerLink.
"Content-based image retrieval," by Wikipedia (Aug. 2, 2011 Revision). Available at: http://en.wikipedia.org/w/index.php?title=Content-based_image_retrieval&oldid=442654277.
"Type Conversion," by Wikipedia (Sep. 5, 2011 revision). Available at: http://en.wikipedia.org/w/index.php?title=Type_conversion&oldid=448573374.
Fundamentals of Computers & Programming in C, by Dixit, J.B. 2005 Laxmi Pub. Lt.
"Distance and Correlation," by Borgatti, Steve. (Wayback machine to Mar. 20, 2011). Available at: http://web.archive.org/web/20110320041117/http://www.analytictech.com/mb876/handouts/distance_and_correlation.htm Original URL: http://www.analytictech.com/mb876/handoutsidistance_and_correlation.htm.
Eitz M et al: "An evaluation of descriptors for large-scale image retrieval from sketched feature lines", Computer and Graphics, Elsevier, GB, vol. 34, No. 5, Oct. 1, 2010, pp. 482-498.
Peter L. Stanchev et al:"Selection of MPEG-7 Image Features for Improving Image Similarity Search on Specific Data Sets" Aug. 17, 2004(Aug. 17, 2004), XP55269991, Michigan, USA Retreived from the internet: URL:https://paws.kettering.edu/~pstanche/haw04.pdf Cited in the Office Action of Jun. 3, 2016 for corresponding EP application No. 13768360.3.
Fukunaga K et al:"A Branch and Bound Algorithm for Computing k-Nearest Neighbors", IEEE Transactions on Computers, IEEE Service Center, Los Alamitos, CA, US, vol. C-24, No. 7, Jul. 1, 1975 (Jul. 1, 1975 ), pp. 750-753, XP011382658, ISSN: 0018-9340, DOI: 10.1109/T-C.1975.224297 Cited in the Office Action of Jun. 16, 2016 for corresponding EP application No. 11872292.5.
Empowering visual Categorization with the GPU, by Sande et al. In: IEEE Trans. On Multimedia, vol. 13, No. 1, Feb. 2011. Available at: IEEE Cited in the Office Action of Jul. 5, 2016 for corresponding U.S. Appl. No. 14/344,913.
Evaluation of Similarity Measurement for Image Retrieval, by Zhang & Lu. In: IEEE. Int'l Conf. Neural Networks & Signal Processing(2003). Available at: IEEE Cited in the Office Action of Jul. 5, 2016 for corresponding U.S. Appl. No. 14/344,913.
Cache Memory: Replacement Policy, by Wang, Ruye(2005). Available at: http://fourier.eng.hmc.edu/e85_old/lectures/memory/node5.html Cited in the Office Action of Jul. 5, 2016 for corresponding U.S. Appl. No. 14/344,913.
"NVIDIA CUDA Compute Unified Device Architecture, programming guide," Nov. 29, 2007(Nov. 29, 2007), pp. I-XIII, 1, XP008139068, Retrieved from the Internet:URL:http://developer.download.nvidia.com/compute/cuda/1_1/NVIDIA_CUDA_Programming_Guide_1.1.pdf [retrieved on Nov. 29, 2007].
David B. Kirk et al:"Programming Massively Parallel Processors—A Hands-on Approach," Dec. 31, 2010 (Dec. 31, 2010 ), pp. 1-279, XP055073181, Retrieved from the Internet: URL:http://www.elsevier.com/books/programming-massively-parallel-processors/kirk/978-0-12-381472-2 [retrieved on Jul. 26, 2013].
The partial translation of Office Action for corresponding Japanese Patent Application No. 2012-078343 dated Feb. 4, 2014.
International Search Report for corresponding PCT patent application No. PCT/JP2013/059546 dated Apr. 23, 2013.
International Search Report for relating PCT patent application No. PCT/JP2013/059551 dated Apr. 23, 2013.

* cited by examiner

FIG.21
| IMAGE | SCORE |
|---|---|
| 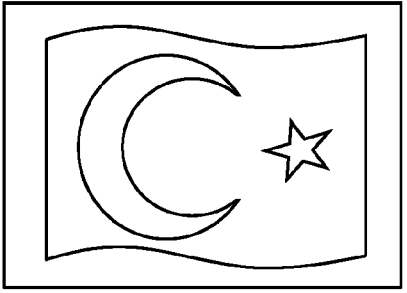 | 35.5 |
| 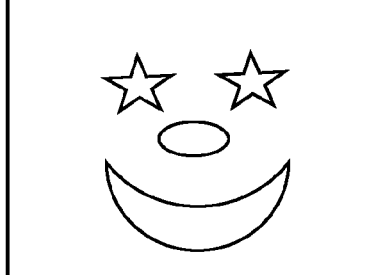 | 29.2 |
| 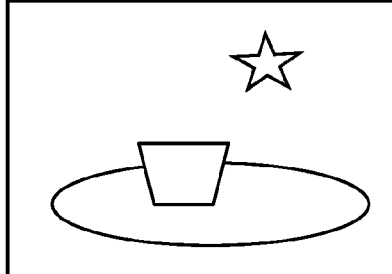 | 20.3 |
| 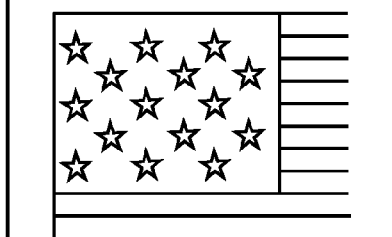 | 10.0 |

| CLUSTER NUMBER | IMAGE NUMBER |
|---|---|
| 3 | 3 |
| 3 | 4 |
| 3 | 5 |
| 3 | 7 |
| 3 | 16 |
| 3 | 4 |
| 3 | 4 |
| 3 | 4 |
| 3 | 16 |
| ⋮ | ⋮ |

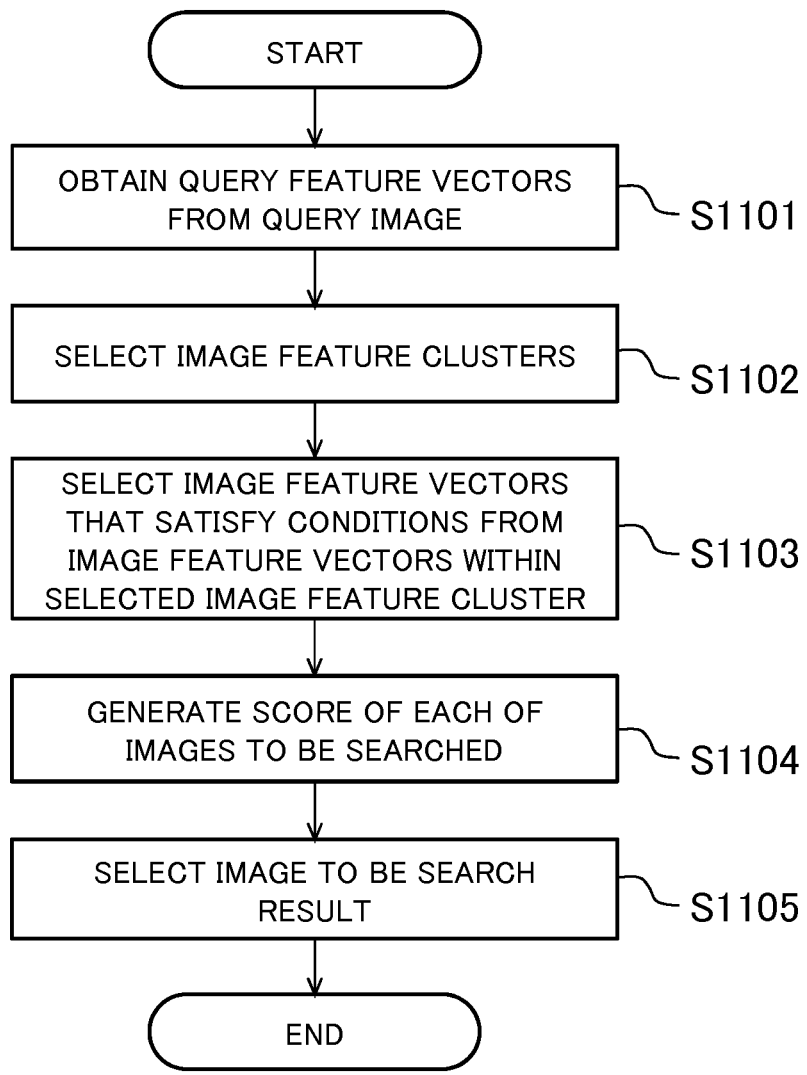

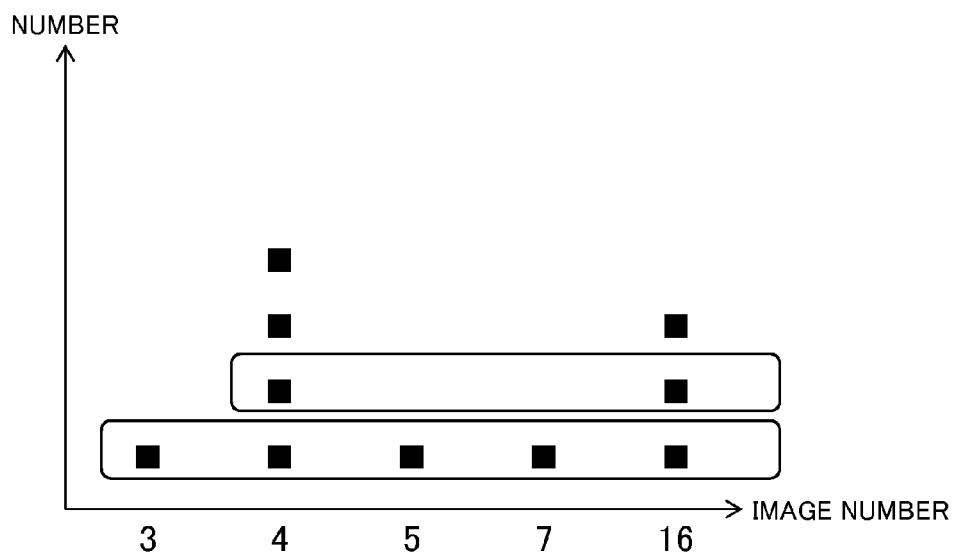

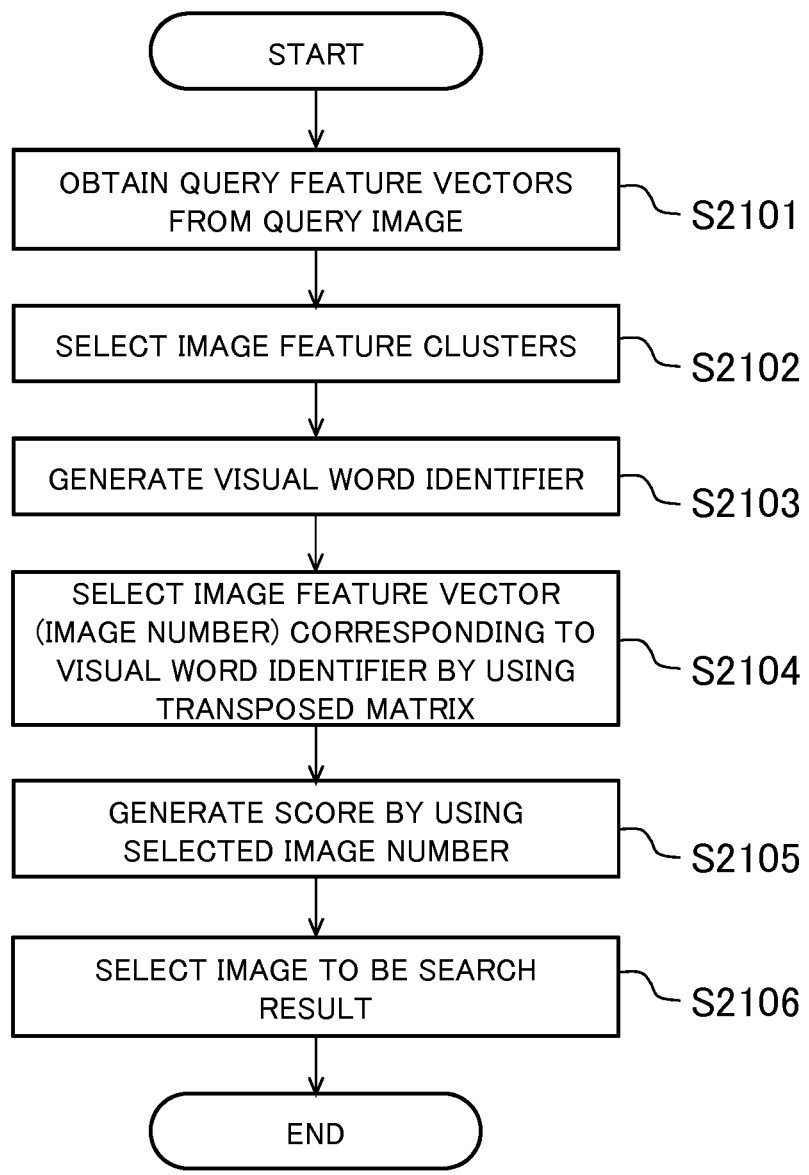

IMAGE SEARCH DEVICE, IMAGE SEARCH METHOD, PROGRAM, AND COMPUTER-READABLE STORAGE MEDIUM

CROSS REFERENCE TO RELATED APPLICATIONS

This application is a National Stage of International Application No. PCT/JP2013/059546 filed Mar. 29, 2013, claiming priority based on Japanese Patent Application No. 2012-078343 filed on Mar. 29, 2012. The contents of each of the above documents are incorporated herein by reference in their entirety.

TECHNICAL FIELD

The present invention relates to an image search device, an image search method, a program, and a computer-readable storage medium.

BACKGROUND ART

Advances in network technology and the like have resulted in an enormous number of image files to be managed. There has been available an image search method for searching the enormous number of images to retrieve an image similar to an image (query image) serving as a query. As one of the image search technologies, there is one that uses a local feature amount indicating a local feature of an image, and with general methods, a score indicating a degree of similarity to the query image is calculated in a simplified manner in order to retrieve similar images from a large amount of images at a short response time.

One of the above-mentioned methods is called "bag of features (BoF) method". This method is obtained by applying a document search method called "bag of words (BoW) method". In the BoF method, each of local feature amounts (hereinafter referred to as "image feature amounts") extracted from an image to be searched is previously stored in association with a visual word corresponding to a word used in the BoW method. Specifically, the image feature amounts are subjected to clustering so that a cluster corresponds to the visual word. Then, a plurality of local feature amounts (hereinafter referred to as "query feature amounts") are extracted from an image serving as a query when a search is performed, to obtain the visual word corresponding to each of the local feature amounts. Then, an appearance frequency of the visual word is statistically processed, to thereby generate a score indicating a degree of similarity between the query image and the image to be searched and retrieve similar images.

In Patent Literature 1, there is disclosed an outline of a method for searching for and retrieving an image by using the visual word, and a technology for searching for retrieving an image by combining an image feature amount vector extracted from a given image with a media feature amount vector extracted from sentences associated with the given image.

CITATION LIST

Patent Literature

[PTL 1] JP 2011-103082 A

SUMMARY OF INVENTION

Technical Problem

With such a score calculation method as described above, a necessary search accuracy may not be obtained. For example, in a BoF method, a score is calculated based on an appearance frequency of a query feature amount converted into a visual word, and hence accuracy of the score deteriorates due to a cluster size of a cluster corresponding to the visual word or clustering accuracy. This phenomenon becomes more conspicuous when the number of image feature amounts corresponding to the visual word is increased. Note that, it does not necessarily suffice to reduce the number of image feature amounts corresponding to the visual word. This is because an error easily occurs in determining the visual word.

The present invention has been made in view of the above-mentioned problem, and an object thereof is to provide a technology capable of searching for and retrieving an image with higher accuracy than in a case where a degree of similarity between a query image and an image to be searched is evaluated based on the appearance frequency of the image feature amount corresponding to the query feature amount as in the BoF method.

Solution to Problem

In order to solve the above-mentioned problem, according to one embodiment of the present invention, there is provided an image search device including: query feature vector obtaining means for obtaining a plurality of query feature vectors each indicating a local feature of an image serving as a query; image feature vector selecting means for selecting a plurality of image feature vectors respectively corresponding to the plurality of query feature vectors based on proximities between the plurality of image feature vectors respectively indicating a plurality of local features of each of a plurality of search target images to be searched, which are stored in storage means in advance for the each of the plurality of search target images, and the plurality of query feature vectors, from a plurality of image feature vectors stored in the storage means; score generating means for generating an image score of the search target image based on a total sum of score elements each depending on the proximities between the selected plurality of image feature vectors each indicating a feature of any one of the plurality of search target images and the query feature vectors corresponding to the selected image feature vectors; and image selecting means for selecting at least one of the plurality of search target images to be searched based on the image score.

Further, according to one embodiment of the present invention, there is provided a program for causing a computer to execute the following processings of: obtaining a plurality of query feature vectors each indicating a local feature of an image serving as a query; selecting a plurality of image feature vectors respectively corresponding to the plurality of query feature vectors based on proximities between the plurality of image feature vectors respectively indicating a plurality of local features of each of a plurality of search target images to be searched, which are stored in storage means in advance for the each of the plurality of search target images, and the plurality of query feature vectors, from a plurality of image feature vectors stored in the storage means; generating an image score of the search target image based on a total sum of score elements each depending on the proximities between the selected plurality of image feature vectors each indicating a feature of any one of the plurality of search target images and the query feature vectors corresponding to the selected image feature vectors; and selecting at least one of the plurality of search target images to be searched based on the image score.

Further, according to one embodiment of the present invention, there is provided an image search method including the steps of: obtaining a plurality of query feature vectors each indicating a local feature of an image serving as a query; selecting a plurality of image feature vectors respectively corresponding to the plurality of query feature vectors based on proximities between the plurality of image feature vectors respectively indicating a plurality of local features of each of a plurality of search target images to be searched, which are stored in storage means in advance for the each of the plurality of search target images, and the plurality of query feature vectors, from a plurality of image feature vectors stored in the storage means; generating an image score of the search target image based on a total sum of score elements each depending on the proximities between the selected plurality of image feature vectors each indicating a feature of any one of the plurality of search target images and the query feature vectors corresponding to the selected image feature vectors; and selecting at least one of the plurality of search target images to be searched based on the image score.

Further, according to one embodiment of the present invention, there is provided a computer-readable storage medium having stored thereon a program for causing a computer to execute the following processings of: obtaining a plurality of query feature vectors each indicating a local feature of an image serving as a query; selecting a plurality of image feature vectors respectively corresponding to the plurality of query feature vectors based on proximities between the plurality of image feature vectors respectively indicating a plurality of local features of each of a plurality of search target images to be searched, which are stored in storage means in advance for the each of the plurality of search target images, and the plurality of query feature vectors, from a plurality of image feature vectors stored in the storage means; generating an image score of the search target image based on a total sum of score elements each depending on the proximities between the selected plurality of image feature vectors each indicating a feature of any one of the plurality of search target images and the query feature vectors corresponding to the selected image feature vectors; and selecting at least one of the plurality of search target images to be searched based on the image score.

According to one embodiment of the present invention, it is possible to search for and retrieve an image with higher accuracy than in a case where the degree of similarity between the query image and the image to be searched is evaluated based on only the appearance frequency of the image feature amount corresponding to the query feature amount.

In one aspect of the present invention, the image search device may further include cluster selecting means for selecting a cluster corresponding to each of the plurality of query feature vectors from a plurality of clusters into which the plurality of image feature vectors stored in the storage means are classified, and the image feature vector selecting means may select the image feature vector corresponding to the plurality of query feature vectors based on the proximities between the plurality of query feature vectors and the image feature vectors belonging to the selected cluster.

According to this aspect, the speed of the image search can be improved.

In one aspect of the present invention, the proximity between each of the selected plurality of image feature vectors and the query feature vector corresponding to the selected image feature vector may be a distance between the image feature vector and the query feature vector.

In one aspect of the present invention, the image feature vector selecting means may select the image feature vector whose distance from the plurality of query feature vectors is smaller than a predetermined threshold value from among the image feature vectors belonging to the selected cluster.

According to this aspect, search accuracy can be controlled by changing the threshold value.

BRIEF DESCRIPTION OF DRAWINGS

FIG. 21 is a diagram illustrating an example of results of statistically processing images corresponding to query feature vectors.

FIG. 24 is a diagram illustrating an example of a processing flow illustrating an outline of processing of the image search unit according to the second embodiment.

FIG. 25 is a diagram for illustrating a distribution of image feature vectors within a third image feature cluster and selection made by query feature vectors.

FIG. 26 is a diagram illustrating an example of a transposed matrix used to generate an image score.

FIG. 27 is a diagram illustrating an example of a processing flow illustrating an outline of processing of an image search unit according to a third embodiment.

DESCRIPTION OF EMBODIMENTS

Figure 1:
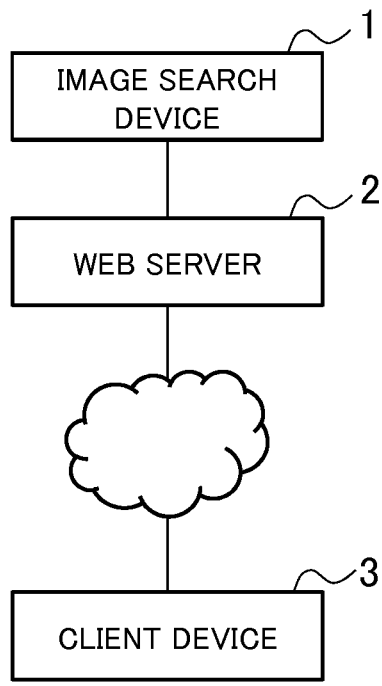
FIG. 1 is a diagram illustrating an example of a configuration of an image search system according to a first embodiment.

In the following, embodiments of the present invention are described with reference to the accompanying drawings. Elements to be described having the same function are designated with the same reference numerals, and the description thereof is omitted.

First Embodiment

FIG. 1 is a diagram illustrating an example of a configuration of an image search system according to a first embodiment. The image search system includes an image search device 1, a web server 2, and a client device 3. The web server 2 is, for example, sever hardware operated by a web server program, and the client device 3 is, for example, a personal computer or a smartphone operated by a program of a web browser. A summary of the operation of the image search system for performing an image search is as follows. First, the web server 2 obtains an image serving as a query to be used for an image search (hereinafter referred to as "query image") from the client device 3 through the network such as the Internet, and inputs the query image to the image search device 1. Subsequently, the image search device 1 retrieves one or a plurality of images similar to the input image, and outputs the images to the web server 2. The web server 2 outputs data that enables the client device 3 to display the images retrieved by the image search device 1.

Figure 2:
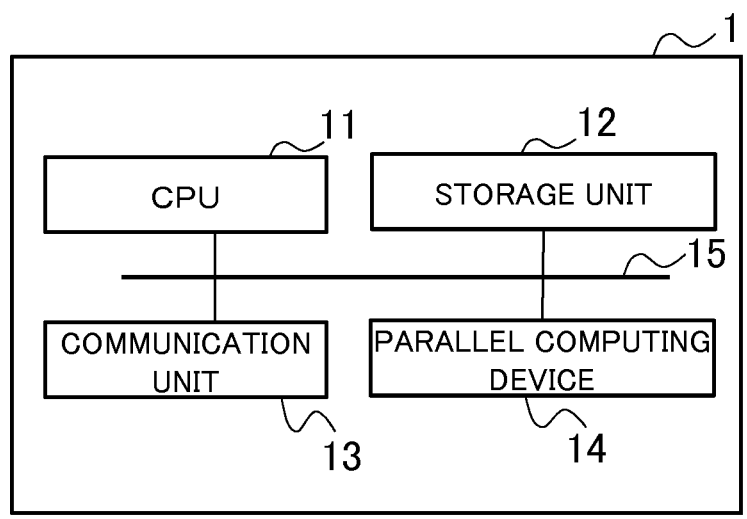
FIG. 2 is a diagram illustrating an example of a configuration of an image search device according to the first embodiment.

FIG. 2 is a diagram illustrating an example of a configuration of the image search device 1 according to the first embodiment. The image search device 1 includes a CPU 11, a storage unit 12, a communication unit 13, a parallel computing device 14, and a bus 15.

The CPU 11 operates in accordance with a program stored in the storage unit 12. The CPU 11 controls the communication unit 13 and the parallel computing device 14. Note that, the above-mentioned program may be provided through the network such as the Internet, or provided by being stored in a computer-readable information storage medium such as a DVD-ROM and a USB memory.

The storage unit 12 includes, for example, a memory device such as a RAM and a ROM and a hard disk drive. The storage unit 12 stores the above-mentioned program. The storage unit 12 also stores information and a computational result input from each unit.

The communication unit 13 implements a function of communicating to/from another device such as the web server 2, and is formed of, for example, communication means such as a network card. The network card includes an integrated circuit for communications and a communication terminal. The communication unit 13 is controlled by the CPU 11 to input information received from another device to the CPU 11 and the storage unit 12 and to transmit information to another device.

The bus 15 forms a path for sending or receiving data to or from the CPU 11, the storage unit 12, the communication unit 13, and the parallel computing device 14. For example, the CPU 11 and the storage unit 12 are connected to the parallel computing device 14 through an expansion bus in the bus 15.

Figure 3:
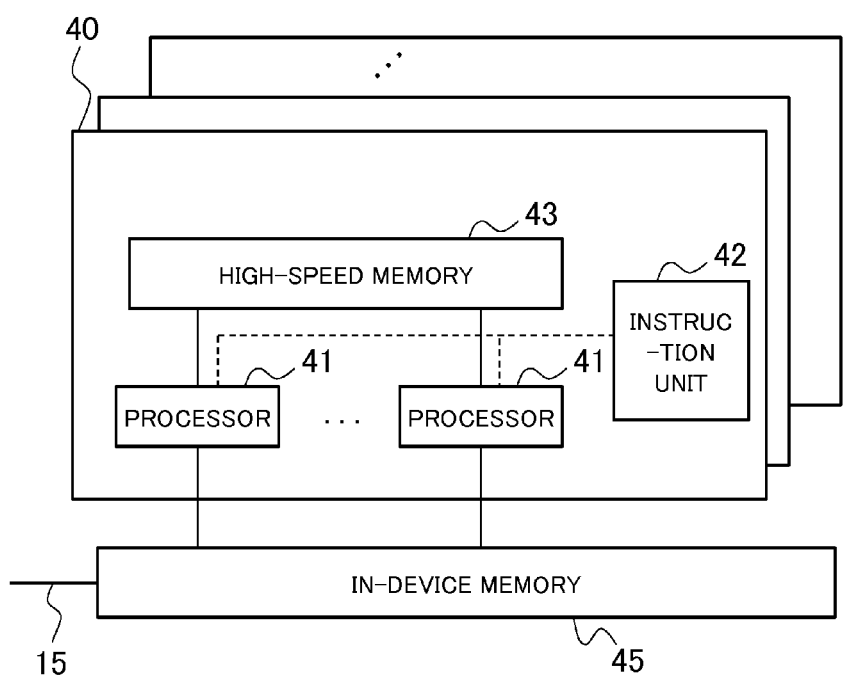
FIG. 3 is a diagram illustrating an example of a configuration of a parallel computing device.

The parallel computing device 14 is hardware good at performing a large amount of the same type of the computation by parallel computation. The parallel computing device 14 is, for example, a graphic processing unit (GPU). FIG. 3 is a diagram illustrating an example of a configuration of the parallel computing device 14. The parallel computing device 14 includes a plurality of parallel execution units 40 and an in-device memory 45. Each parallel execution unit 40 includes a plurality of processors 41, an instruction unit 42, and a high-speed memory 43.

Each of the plurality of processors 41 performs processing such as floating-point computation and reading or writing data from or to the in-device memory 45 and the high-speed memory 43. The instruction unit 42 causes the plurality of processors 41, which are included in the parallel execution unit 40 including the instruction unit 42, to perform processing based on a program stored in the in-device memory 45 and the like. The plurality of processors 41 included in one of the plurality of parallel execution units 40 process the same instruction in accordance with an instruction from the instruction unit 42 included in such parallel execution unit 40. With this configuration, the plurality of processors 41 can be controlled by one instruction unit 42, which can suppress an increase in scale of a circuit of the instruction unit 42. The processors 41 included in the parallel computing device 14 can be increased in number compared to those of the CPU 11, which facilitates a more significant speedup than in a case of using a plurality of processors that are highly independent of one another in such specific calculation processing as described later.

The in-device memory 45 is formed of a DRAM, and the DRAM can be accessed at higher speed than a RAM used for the storage unit 12. The in-device memory 45 is connected to the CPU 11 and the storage unit 12 through the bus 15. The parallel computing device 14 also includes a circuit for transferring data between the in-device memory 45 and the storage unit 12 via a DMA transfer. The high-speed memory 43 is formed of, for example, an SRAM that is capable of higher speed access than the in-device memory 45. There is not so much difference between latency when the processor 41 accesses the high-speed memory 43 and latency when the processor 41 accesses its internal register. Here, each of the in-device memory 45 and the high-speed memory 43 is a shared memory accessible in common from the plurality of processors 41.

Figure 4:
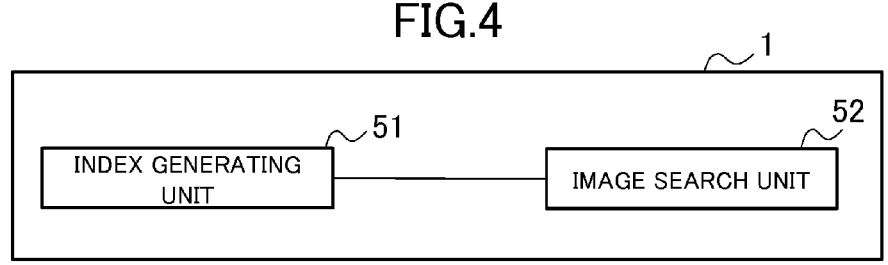
FIG. 4 is a functional block diagram illustrating functions of the image search device according to the first embodiment.

FIG. 4 is a functional block diagram illustrating functions of the image search device 1 according to the first embodiment. The image search device 1 functionally includes an index generating unit 51 and an image search unit 52. These functions are implemented by the CPU 11 executing the program stored in the storage unit 12 and controlling the communication unit 13 and the parallel computing device 14, and by the parallel computing device 14 executing the program for the parallel computing device 14.

[Generation of Index]

The following description is made of processing for classifying image feature vectors 22 into clusters and generating an index.

The index generating unit 51 generates, from a plurality of images to be searched, the image feature vector 22 used for the image search and an index allowing an easy selection of the image feature vector 22. The image search unit 52 searches for an image similar to the query image with use of the index and the image feature vector 22.

Figure 5:
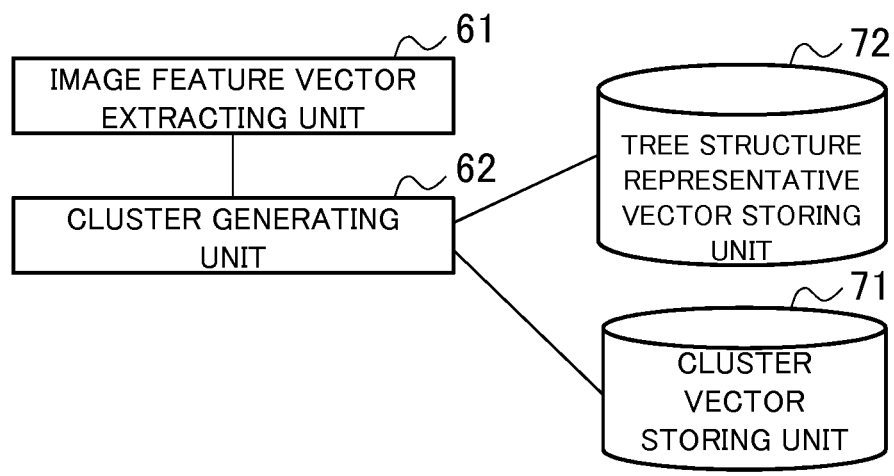
FIG. 5 is a functional block diagram illustrating a functional configuration of an index generating unit according to the first embodiment.

FIG. 5 is functional block diagram illustrating a functional configuration of the index generating unit 51. The index generating unit 51 functionally includes an image feature vector extracting unit 61 and a cluster generating unit 62. The cluster generating unit 62 generates a tree structure of a representative vector, which is an index of a cluster, and stores information on the index into a tree structure representative vector storing unit 72. The cluster vector storing unit 71 stores information on the image feature vector 22 belonging to the cluster (cluster represented by the representative vector), which is a leaf of the tree structure. Specifically, the cluster vector storing unit 71 and the tree structure representative vector storing unit 72 are formed of the storage unit 12.

The image feature vector extracting unit 61 is implemented mainly by the CPU 11, the storage unit 12, and the parallel computing device 14. The image feature vector extracting unit 61 extracts one or a plurality of image feature vectors 22 from each of a plurality of images to be searched stored in the storage unit 12. Further, the image feature vector extracting unit 61 stores the extracted image feature vectors 22 in the storage unit 12 in association with the image from which the image feature vectors 22 are extracted.

Figure 6:
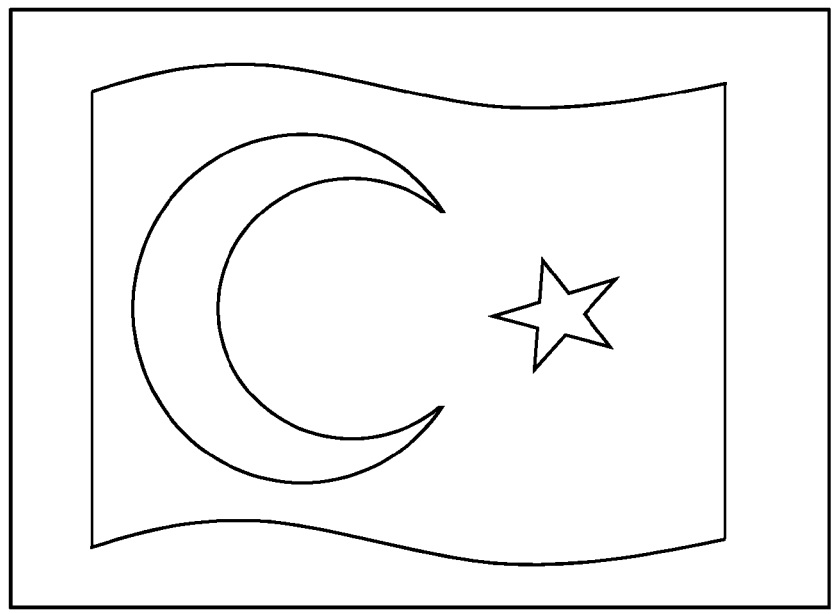
FIG. 6 is a diagram illustrating an example of an image to be searched.
Figure 7:
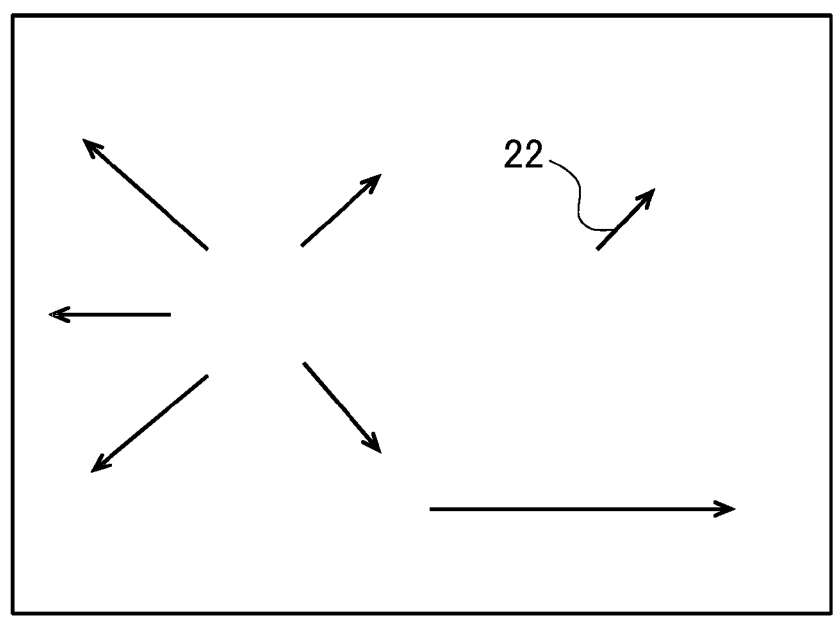
FIG. 7 is a diagram illustrating a concept of image feature vectors extracted from an image.

FIG. 6 is a diagram illustrating an example of images to be searched. FIG. 7 is a diagram illustrating a concept of image feature vectors 22 extracted from an image. Each of the image feature vectors 22 extracted from the image is a local characteristic amount, which shows local features in the image. Each of the image feature vectors 22 is a vector having, for example, 128 elements (dimensions). The well-known methods, such as Scale-Invariant Feature Transform (SIFT) and Speeded Up Robust Features (SURF), may be used in order to extract the image feature vectors 22 from an image. The number of elements which each image feature vector 22 has may be changed in accordance with a method of extracting image feature vectors from an image. Further, the number of image feature vectors 22 extracted from an image may be a predetermined number (e.g., 300). The number of image feature vectors 22 extracted from a simple image, however, may be less than the predetermined number.

The cluster generating unit 62 is implemented mainly by the CPU 11, the storage unit 12, and the parallel computing device 14. The cluster generating unit 62 classifies at least a part of the plurality of image feature vectors 22 extracted by the image feature vector extracting unit 61 into a plurality of clusters by clustering. In other words, a plurality of clusters, into which at least a part of the extracted image feature vectors 22 is classified, are generated. Further, representative vectors that represents each of those clusters are generated. The clusters into which the image feature vectors 22 are classified may be multistage. In accordance therewith, processing for classification into the clusters is not limited to a one-stage process, but may be multistage processes. The following description is made of an example of processing in which the multistage processes are implemented by being recursively called. Note that, in a specific example, two-stage clustering processes are performed. In the first stage, a plurality of image feature vectors 22 extracted by the image feature vector extracting unit 61 are classified into 1,024 clusters, and in the second stage, each of the 1,024 clusters is classified into 512 clusters.

In respective stages of the processing performed by the cluster generating unit 62, a plurality of obtained image feature vectors 22 are classified into a predetermined number of clusters by clustering so as to generate a plurality of clusters, representative vectors of the plurality of generated clusters are generated, and the generated representative vectors are stored in the tree structure representative vector storing unit 72 as the representative vectors in the stage. When the stage in progress is not the last stage, the cluster generating unit 62 recursively calls the process in the next stage using a plurality of image feature vectors 22 belonging to respective clusters generated in the stage in progress as input information. The representative vector is, for example, the centroid for the image feature vector 22 belonging to the classified cluster, and representative of the cluster. Further, the cluster generating unit 62 stores, for each cluster generated in the last stage, the image feature vectors 22 belonging to the cluster into the cluster vector storing unit 71.

In the above-mentioned example, in the first stage, the cluster generating unit 62 classifies the obtained image feature vectors 22 into 1,024 clusters, then generates respective representative vectors of the classified clusters in the first stage, and stores the generated representative vectors in the first stage into the tree structure representative vector storing unit 72. In the second stage, the cluster generating unit 62 further classifies the respective 1,024 clusters into 512 clusters using the plurality of image feature vectors 22 belonging to corresponding one of the 1,024 clusters generated in the first stage as input information, then generates respective representative vectors of the classified clusters in the second stage, and stores the generated representative vectors in the lower stage into the tree structure representative vector storing unit 72. When all clusters are generated in the second stage, the total number of the clusters in the second stage equals to (1024×512). The cluster generating unit 62 also stores, for each cluster generated in the second stage, the image feature vectors 22 belonging to the cluster into the cluster vector storing unit 71. In the following, for simplicity of description, the representative vector that is representative of the cluster in the first stage is referred to as "upper representative vector", and the representative vector that is representative of the cluster in the last stage (second stage in the above-mentioned example) is referred to as "representative feature vector". The finally generated cluster (cluster in the second stage in the above-mentioned example) is also referred to as "image feature cluster".

When classifying the image feature vectors 22 into clusters, a well-known clustering method, such as k-means, may be employed. The number of the clusters is preferably a power of 2 considering the processes performed in the image search unit 52 described later, but may not necessarily be a power of 2. When the image feature vectors 22 included in all images are classified, a plurality of image feature vectors 22 belong to each image feature cluster. The cluster generating unit 62 performs two-stage recursive processes, thereby storing information of two tiers into the tree structure representative vector storing unit 72. Note that, the image feature vector extracting unit 61 and the cluster generating unit 62 may perform calculation without using the parallel computing device 14. However, it is desired that the parallel computing device 14 be used to perform the above-mentioned calculation. This is because, according to a comparative experiment, a calculation speed in a case of using the parallel computing device 14 increased to 20 to 200 times faster than in a case of not using the parallel computing device 14.

Figure 8:
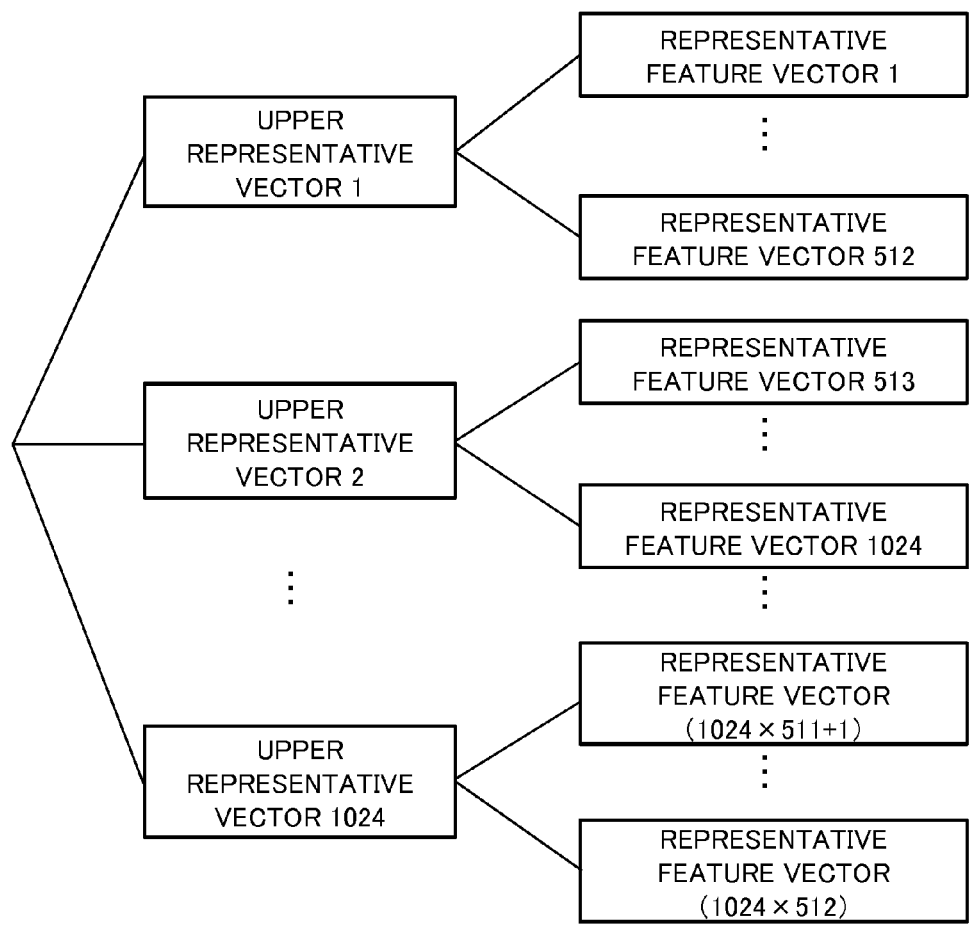
FIG. 8 is a diagram illustrating an example of a tree structure of representative vectors.

FIG. 8 is a diagram illustrating an example of a tree structure of representative vectors. In a case where the cluster generating unit 62 performs the above-mentioned two-stage processes, two-stage representative vectors corresponding to two-stage clusters construct a tree structure. The number of the upper representative vectors is 1,024, and each of the upper representative vectors is a parent of 512 representative feature vectors. When the tree structure based on multistage clusters is used in the above-mentioned manner, the image search unit 52 can perform a search by using a parent-child relationship between the representative vectors corresponding to the tree structure.

[Processing for Searching for and Retrieving Image]

Figure 9:
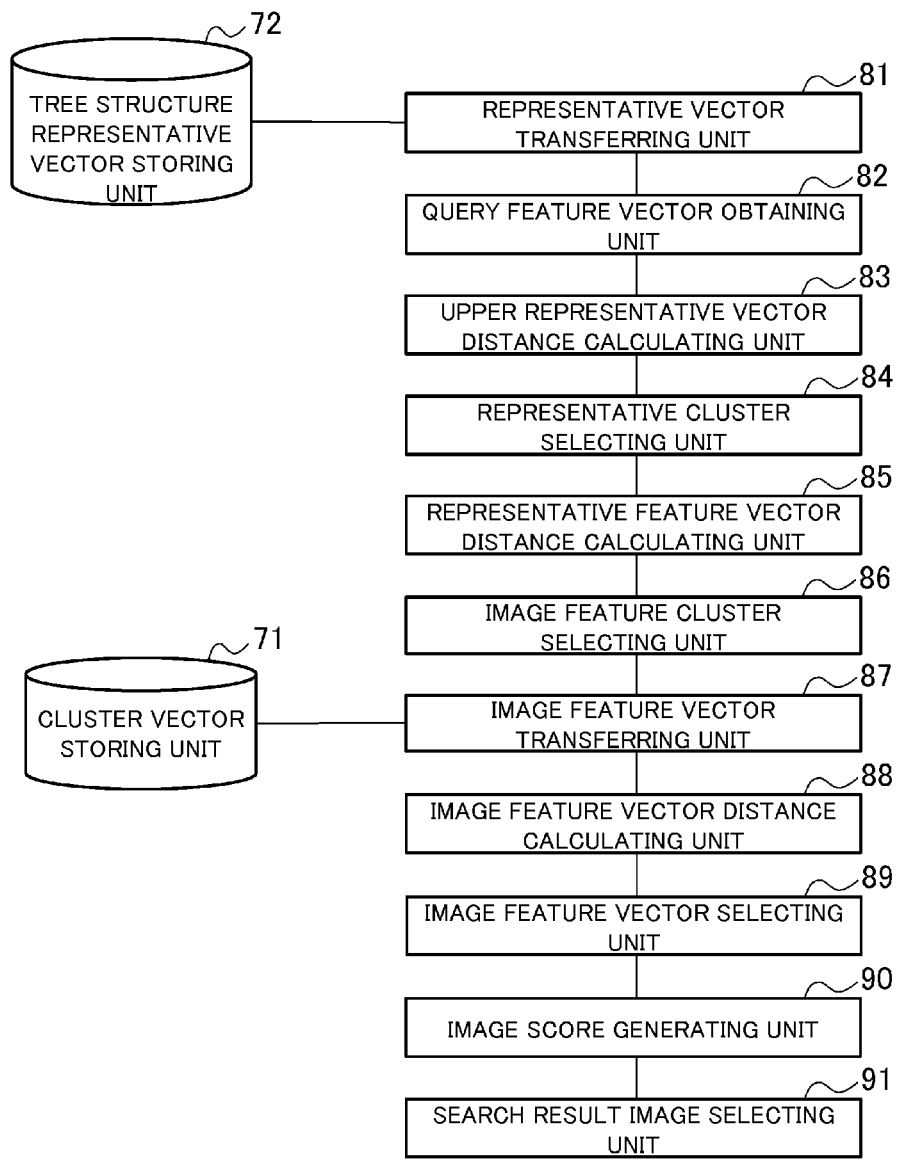
FIG. 9 is a functional block diagram illustrating a functional configuration of an image search unit according to the first embodiment.

FIG. 9 is a functional block diagram illustrating a functional configuration of the image search unit 52. The image search unit 52 functionally includes a representative vector transferring unit 81, a query feature vector obtaining unit 82, an upper representative vector distance calculating unit 83, a representative cluster selecting unit 84, a representative feature vector distance calculating unit 85, an image feature cluster selecting unit 86, an image feature vector transferring unit 87, an image feature vector distance calculating unit 88, an image feature vector selecting unit 89, an image score generating unit 90, and a search result image selecting unit 91.

Figure 10:
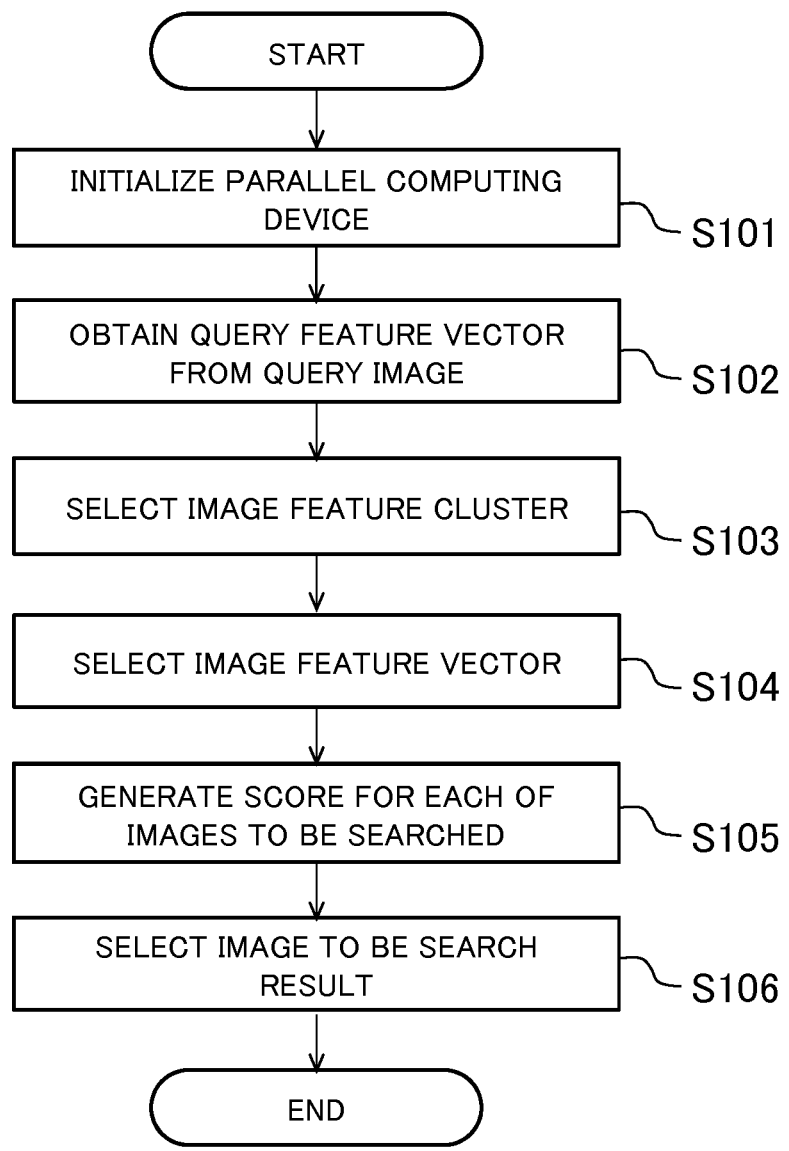
FIG. 10 is a diagram illustrating an example of a schematic processing flow of processing of the image search unit according to the first embodiment.

FIG. 10 is a diagram illustrating an outline of processing of the image search unit 52 according to the first embodiment. The following description is made of respective functions included in the image search unit 52 with reference to a processing flow illustrated in FIG. 10.

[Initialization of Parallel Computing Device]

The representative vector transferring unit 81 is implemented mainly by the parallel computing device 14 and the storage unit 12. The representative vector transferring unit 81 transfers the plurality of upper representative vectors and the plurality of representative feature vectors stored in the tree structure representative vector storing unit 72 to the in-device memory 45, which is accessible in common from the plurality of processors 41 as processing for initializing the parallel computing device 14 (Step S101).

The representative vector transferring unit 81 uses direct memory access (DMA) functions of the parallel computing device 14 or the bus 15 to transfer the data from the storage unit 12 to the in-device memory 45.

Figure 11:
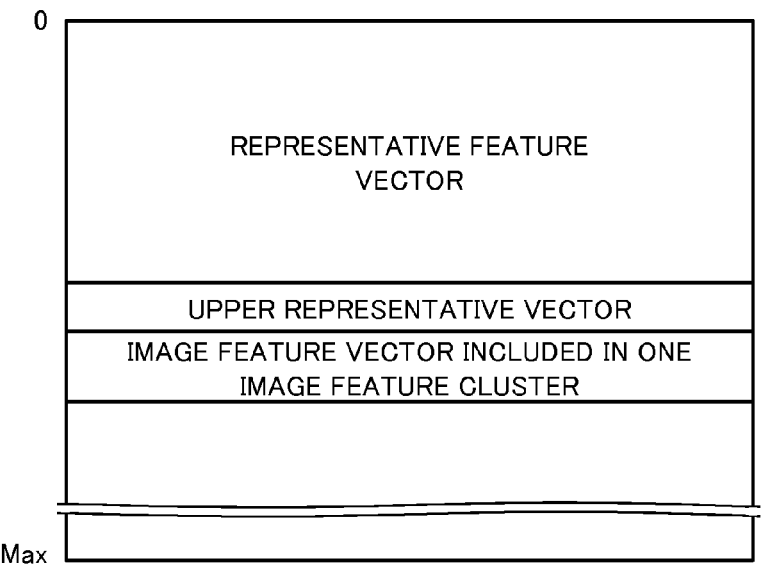
FIG. 11 is a diagram illustrating an example of a data arrangement in an in-device memory.

FIG. 11 is a diagram illustrating an example of a data arrangement in the in-device memory 45. The in-device memory 45 includes a region for storing the representative feature vector, a region for storing the upper representative vector, and a region for storing the image feature vectors 22 included in one image feature cluster. The representative vector transferring unit 81 stores information on a plurality of representative vectors stored in the storage unit 12 into the pre-assigned memory region of the in-device memory 45. Storing of data into the region for storing the image feature cluster is described later.

When it is assumed that the elements of the representative feature vector are 128 dimensions, the number of representative feature vectors is the same as the number of the image feature clusters (1024×512), and each element is 1-byte integer, a total data amount of the plurality of representative feature vectors is (1024×512×128) bytes (B), i.e., 64 MB. In this case, the number of the plurality of upper representative vectors is 1,024, and similarly, a data amount of the plurality of upper representative vectors is thus (1024×128) bytes, i.e., 128 KB. For example, a memory size of the in-device memory 45 installed in the existing GPU is about 1 GB. When it is assumed that the size of the in-device memory 45 is also 1 GB, a data amount of the plurality of representative vectors is less than the size of the in-device memory 45.

On the other hand, when it is assumed that the number of images is 1 million, and the number of image feature vectors 22 that are extracted from an image is 300, a data amount of the image feature vectors 22 included in the plurality of image feature clusters is (1 million×300×128) bytes, i.e., about 36 GB, and cannot be stored in the in-device memory 45. The average number of the image feature vectors 22 for each image feature cluster is (100 million×300÷(1024×512)), i.e., about 600, and thus the data amount is about 75 KB. Even when the number of the image feature vectors 22 included in the image feature cluster is changed to some degree by clustering, the sum of the data amount of the plurality of representative feature vectors, the data amount of the plurality of upper representative vectors, and the data amount of the image feature vectors 22 included in an image feature cluster is less than the size of the in-device memory 45.

Figure 12:
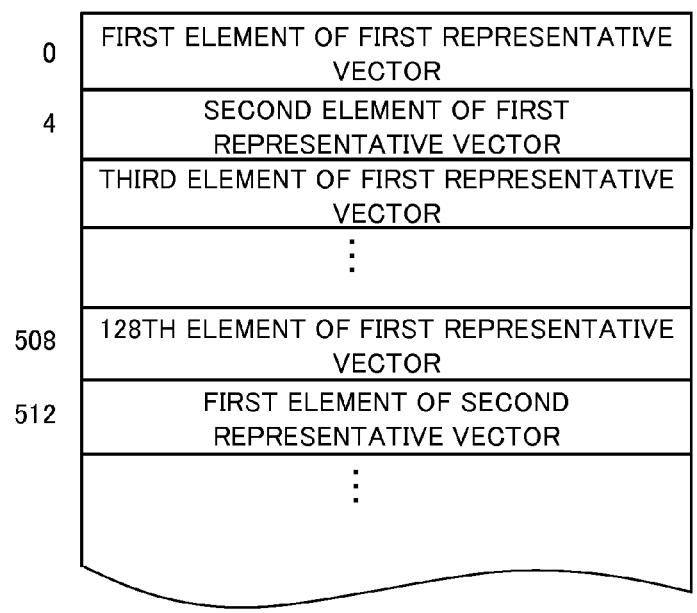
FIG. 12 is a diagram illustrating an example of an arrangement of representative vectors in the in-device memory.

FIG. 12 is a diagram illustrating an example of an arrangement of representative vectors in the in-device memory 45. The size of each element of the representative vector stored in the in-device memory 45 is 4 bytes, and elements are lined up in order. Further, the beginning address of data of one of the representative vectors is multiples of the number of bytes of data that can be read out from the in-device memory 45 in bulk (e.g., 32 or 64). This data structure allows the plurality of processors 41 to read data stored in the in-device memory 45 in bulk in the process of distance calculation described later. Although the size of each element of the representative vector is 1 byte, the representative vector transferring unit 81 transfers, to the in-device memory 45, data in which the size of each element is converted into 4 bytes so that the data can be readout in bulk. Note that, the upper representative vector and the image feature vectors 22 included in an image feature cluster are also stored in the in-device memory 45 by a similar data structure. In the in-device memory 45, the data of the plurality of representative feature vectors, the plurality of upper representative vectors, and the image feature vectors 22 included in an image feature cluster is increased four times in the amount, but the sum of the data amount is still less than the size of the in-device memory 45 in this example. In this embodiment, the number of image feature clusters or representative vectors may be adjusted so that at least the sum of the data amount of the plurality of representative feature vectors and the plurality of upper representative vectors in the in-device memory 45 is within the size of the in-device memory 45.

[Obtainment of Query Feature Vector]

The query feature vector obtaining unit 82 is implemented mainly by the CPU 11, the storage unit 12, and the parallel computing device 14. After the parallel computing device 14 is initialized, the query feature vector obtaining unit 82 obtains one or a plurality of query feature vectors from the query image (Step S102). Further, the query feature vector obtaining unit 82 stores the one or a plurality of query feature vectors extracted from the query image into the in-device memory 45 serving as a shared memory.

Figure 13:
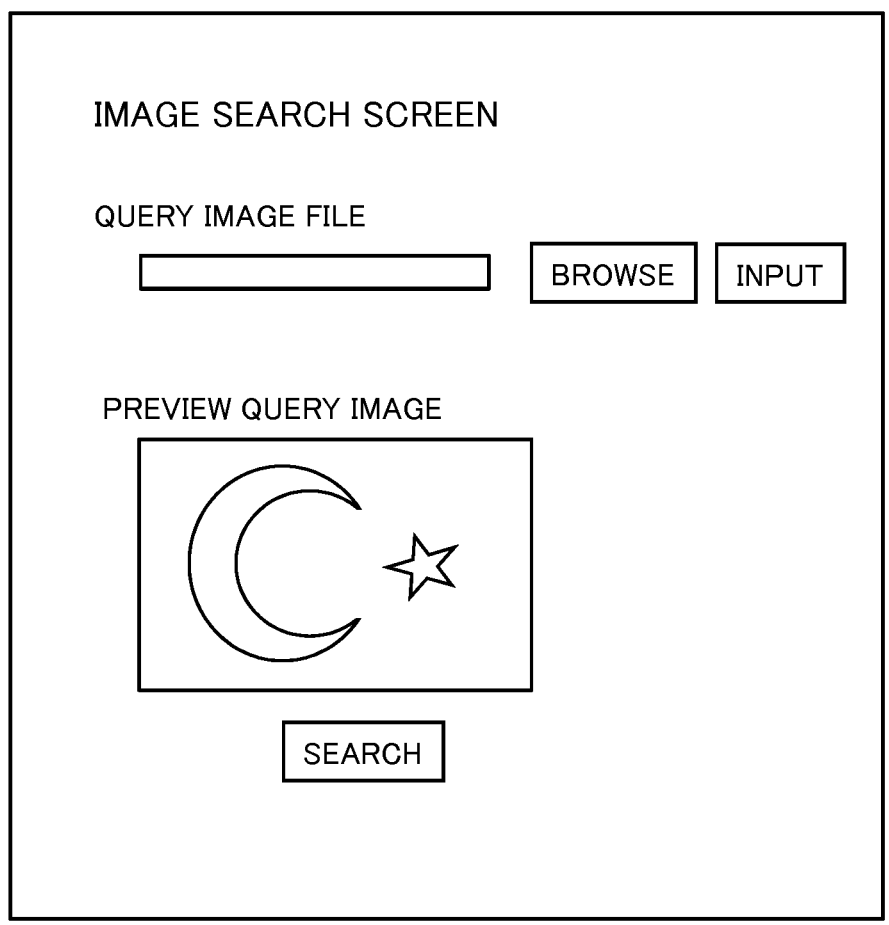
FIG. 13 is a diagram illustrating an example of a screen to which an image serving as a query is input.

First, the query feature vector obtaining unit 82 obtains a query image from the client device 3 through the web server 2. FIG. 13 is a diagram illustrating an example of a screen to which the query image is input. The client device 3 displays the screen using data generated by the web server 2. The query image may be obtained by a user uploading an image file in the client device 3, or sending an URL of an image displayed on a web page. Alternatively, the query image may be obtained by being selected from among images stored in a photo-sharing service, for example. The query feature vector obtaining unit 82 then obtains the obtained query image through the web server 2, and extracts and obtains one or a plurality of query feature vectors from the query image. The query feature vector is generated by the same method as used by the image feature vector extracting unit 61 to extract the image feature vector 22. Next, the query feature vector obtaining unit 82 stores the query feature vectors in the in-device memory 45. Here, the CPU 11 may extract the query feature vectors, and the parallel computing device 14 may load the query feature vectors into the in-device memory 45. Alternatively, the query image may be loaded into the parallel computing device 14, and the parallel computing device 14 may extract and store the query feature vectors in the in-device memory 45.

[Selection of Image Feature Cluster]

Next, the image search unit 52 selects the image feature cluster corresponding to each of the plurality of query feature vectors (Step S103). This process is performed by the upper representative vector distance calculating unit 83, the representative cluster selecting unit 84, the representative feature vector distance calculating unit 85, and the image feature cluster selecting unit 86.

The upper representative vector distance calculating unit 83 is implemented mainly by the parallel computing device 14. The upper representative vector distance calculating unit 83 calculates distances between each of the plurality of upper representative vectors and the query feature vector using the plurality of parallel processors 41. In the following, the details of distance calculation by the upper representative vector distance calculating unit 83 are described. Note that, the processes by the upper representative vector distance calculating unit 83, the representative cluster selecting unit 84, the representative feature vector distance calculating unit 85, the image feature cluster selecting unit 86, the image feature vector distance calculating unit 88, and the image feature vector selecting unit 89 are performed for each query feature vector extracted from the query image.

Figure 14:
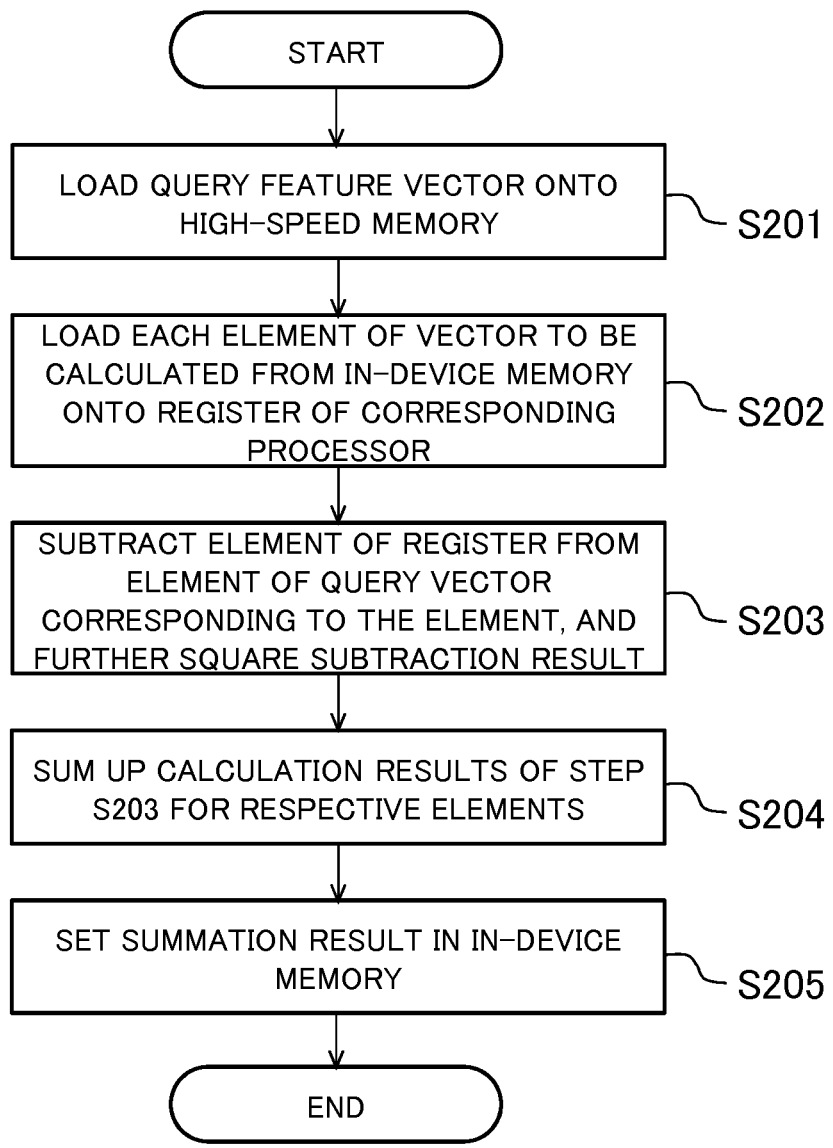
FIG. 14 is a diagram illustrating an example of a processing flow of distance calculation.

FIG. 14 is a diagram illustrating an example of a processing flow of the distance calculation. First, the upper representative vector distance calculating unit 83 loads the query feature vectors from the in-device memory 45 into the high-speed memory 43 of the parallel execution unit 40 where the distance calculation is performed (Step S201). Subsequently, the upper representative vector distance calculating unit 83 loads each element of a vector as calculation target (here, upper representative vector) from the in-device memory 45 into a register of the processor 41 in which such element is calculated (Step S202). At this time, the plurality of processors 41 read, in bulk from the in-device memory 45, data of the vector as calculation target. The data of the vector as calculation target is stored in the in-device memory 45 in advance by e.g., the representative vector transferring unit 81 so that the data is read in bulk, and thus the plurality of processors 41 can read the data. The upper representative vector distance calculating unit 83 then subtracts the elements of the vector as calculation target stored in the register from the corresponding elements of the query feature vector, and squares the subtraction result (Step S203). In the distance calculation, another distance function such as an absolute value of a subtraction result may be used instead of squaring the subtraction result. The distance used in the distance function is not limited to the Euclidean distance (L2) such as in Step S203, and may be a cosign, a Manhattan distance (L1), or the like.

Next, the upper representative vector distance calculating unit 83 sums the calculation results obtained in Step S103 regarding respective elements of the vector as calculation target (Step S204). Subsequently, the upper representative vector distance calculating unit 83 stores the sum of the results into the in-device memory 45 (Step S205). Note that, when the number of processors 41 that are included in a parallel execution unit 40 and execute the same instruction is less than the number of the elements of the query feature vector or the vector as calculation target, the processes of Step S202 to Step S204 are divided in accordance with the number of the processors 41, and are executed for a plurality of times. Further, when there are a plurality of parallel execution units 40, the upper representative vector distance calculating unit 83 causes another parallel execution unit 40 to execute processes of Steps S201 to S205 for another vector as calculation target. Other query feature vectors extracted from the query image may also be calculated in parallel. In this manner, the distance calculation of the query feature vectors and other plurality of vectors as calculation targets is performed in parallel based on the parallel computing capability of the parallel computing device 14 such as a GPU. As can be appreciated from the processes of the distance calculation, the distance calculation of the plurality of vectors arranged properly in the in-device memory 45 and the query feature vectors has high compatibility with hardware such as a GPU, and is performed very fast.

The representative cluster selecting unit 84 is implemented mainly by the parallel computing device 14. The representative cluster selecting unit 84 selects one of groups of the plurality of representative feature vectors based on the distance between the query feature vector and the plurality of respective upper representative vectors calculated in the upper representative vector distance calculating unit 83. More specifically, for example, the representative cluster selecting unit 84 selects a group of plurality of representative feature vectors that are children of the upper representative vector having the shortest distance from the query feature vector. The groups of the representative feature vectors correspond to the respective clusters (representative clusters) in the first stage. Selecting of a group of representative feature vectors corresponds to selecting of a representative cluster corresponding to the group. Each of the upper representative vectors may represent a plurality of representative feature vectors. More specifically, the representative cluster selecting unit 84 selects a group of the representative vectors by calculating a beginning address of a region in a memory for storing the group of the representative vectors. For example, when the number of representative feature vectors to be children of an upper representative vector is fixed regardless of the upper representative vector and when it is clear in what position in the order the upper representative vector having the shortest distance is, the representative cluster selecting unit 84 can obtain the beginning address by a simple calculation such as multiplication. In this manner, a calculation requiring a branch or additional memory access is not necessary, and thus the processing to make better use of the performance of hardware such as a GPU is possible.

The representative feature vector distance calculating unit 85 is implemented mainly by the parallel computing device 14. The representative feature vector distance calculating unit 85 calculates distances between each of at least some of the plurality of representative feature vectors and the query feature vector using the plurality of parallel processors 41. In this case, a representative feature vector as calculation target is a representative feature vector belonging to the group selected by the representative cluster selecting unit 84. The representative feature vector distance calculating unit 85 calculates distances in accordance with the flow of FIG. 14 similarly to the way in which the upper representative vector distance calculating unit 83 calculates the distances. However, the vector as calculate target is the above-mentioned representative feature vector. Similarly to the upper representative vector distance calculating unit 83, this process has high compatibility with hardware such as a GPU, and is performed very fast.

The image feature cluster selecting unit 86 is implemented mainly by the parallel computing device 14. The image feature cluster selecting unit 86 selects one of the plurality of image feature clusters based on the distance between the query feature vector and each of a plurality of representative feature vectors calculated by the representative feature vector distance calculating unit 85. More specifically, for example, the image feature cluster selecting unit 86 selects an image feature cluster represented by the representative feature vector having the shortest distance from the query feature vector.

Note that, in this embodiment, the representative vectors have a two-stage tree structure, such as the upper representative vectors and the representative feature vectors, but may have a one-stage structure without the upper representative vectors. In this case, the processes of the upper representative vector distance calculating unit 83 and the representative cluster selecting unit 84 are not necessary, and the representative feature vector distance calculating unit 85 performs distance calculation for all representative feature vectors. Alternatively, the representative vectors may have a three-stage or more structure.

[Selection of Image Feature Vector]

After the image feature cluster is selected, the image search unit 52 calculates a distance between each of the plurality of query feature vectors and the image feature vector 22 belonging to the selected image feature cluster, and selects one or a plurality of image feature vectors 22 corresponding to the query feature vector based on the distance (Step S104). This process is performed by the image feature vector transferring unit 87, the image feature vector distance calculating unit 88, and the image feature vector selecting unit 89.

The image feature vector transferring unit 87 is implemented mainly by the storage unit 12 and the parallel computing device 14. The image feature vector transferring unit 87 transfers the plurality of image feature vectors 22 belonging to the image feature cluster selected by the image feature cluster selecting unit 86 from the cluster vector storing unit 71 to the in-device memory 45, which is accessible in common from the plurality of processors 41. Similarly to the representative vector transferring unit 81 configured to transfer, for example, the representative feature vector, the image feature vector transferring unit 87 arranges data of the image feature vector 22 so as to allow the plurality of processors 41 to read data stored in the in-device memory 45 in bulk.

The image feature vector distance calculating unit 88 is implemented mainly by the parallel computing device 14. The image feature vector distance calculating unit 88 calculates distances between each of the plurality of image feature vectors 22 and the query feature vector using the plurality of parallel processors 41. Here, the image feature vector 22 used for calculation is the image feature vector 22 belonging to the image feature cluster selected by the image feature cluster selecting unit 86. The data has been transferred by the image feature vector transferring unit 87 to the in-device memory 45. The image feature vector distance calculating unit 88 calculates a distance for each query feature vector in accordance with the flow of FIG. 14 similarly to the way in which the upper representative vector distance calculating unit 83 calculates the distances. However, the vector as calculation target is the image feature vector 22. Similarly to the upper representative vector distance calculating unit 83, this process has high compatibility with hardware such as a GPU, and is performed very fast.

The image feature vector selecting unit 89 is implemented mainly by the parallel computing device 14. The image feature vector selecting unit 89 selects the plurality of image feature vectors 22 corresponding to each of the plurality of query feature vectors based on proximities between the plurality of query feature vectors and the plurality of image feature vectors 22 belonging to the selected image feature cluster. As the proximity, a distance is used in this example. Here, the image feature vector selecting unit 89 selects the plurality of image feature vectors 22 that satisfy the following condition. The condition indicates that one image feature vector 22 is selected for a given query feature amount from each of a plurality of images to be searched. This condition prevents a plurality of image feature vectors 22 extracted from a given image from corresponding to one query feature vector.

Figure 15:
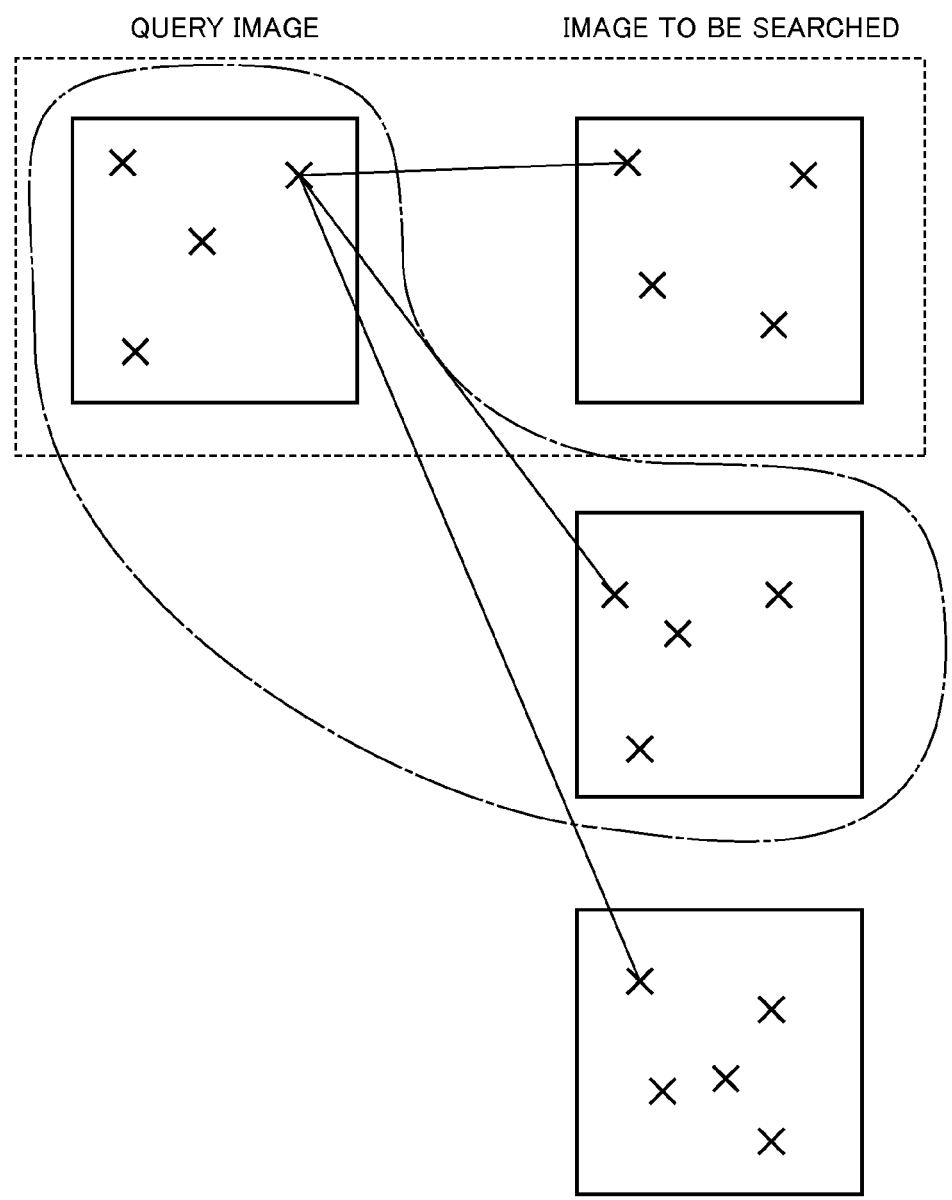
FIG. 15 is a diagram illustrating an example of a correspondence between a query feature vector extracted from a query image and an image feature vector extracted from a plurality of images to be searched.

FIG. 15 is a diagram illustrating an example of a correspondence between the query feature vector extracted from the query image and the image feature vector 22 extracted from the plurality of images to be searched. One rectangle illustrated on the left side of FIG. 15 indicates the query image, and "x" marks included therein indicate the query feature vectors extracted from the query image. Each of rectangles arranged vertically on the right side of FIG. 15 indicates an image to be searched, and the respective "x" marks included in each of the rectangles indicate the image feature vector 22 extracted from the image. As illustrated in FIG. 15, one query feature vector corresponds to only one image feature vector 22 between a given query image and one of the images to be searched. Meanwhile, the image feature vector 22 extracted from the other images to be searched may exist with respect to the query feature vector. It should be understood that some images do not include the image feature vector 22 corresponding to the query feature vector, and hence the number of image feature vectors 22 corresponding to a given query feature vector which are extracted from one given image is one or zero.

Figure 16:
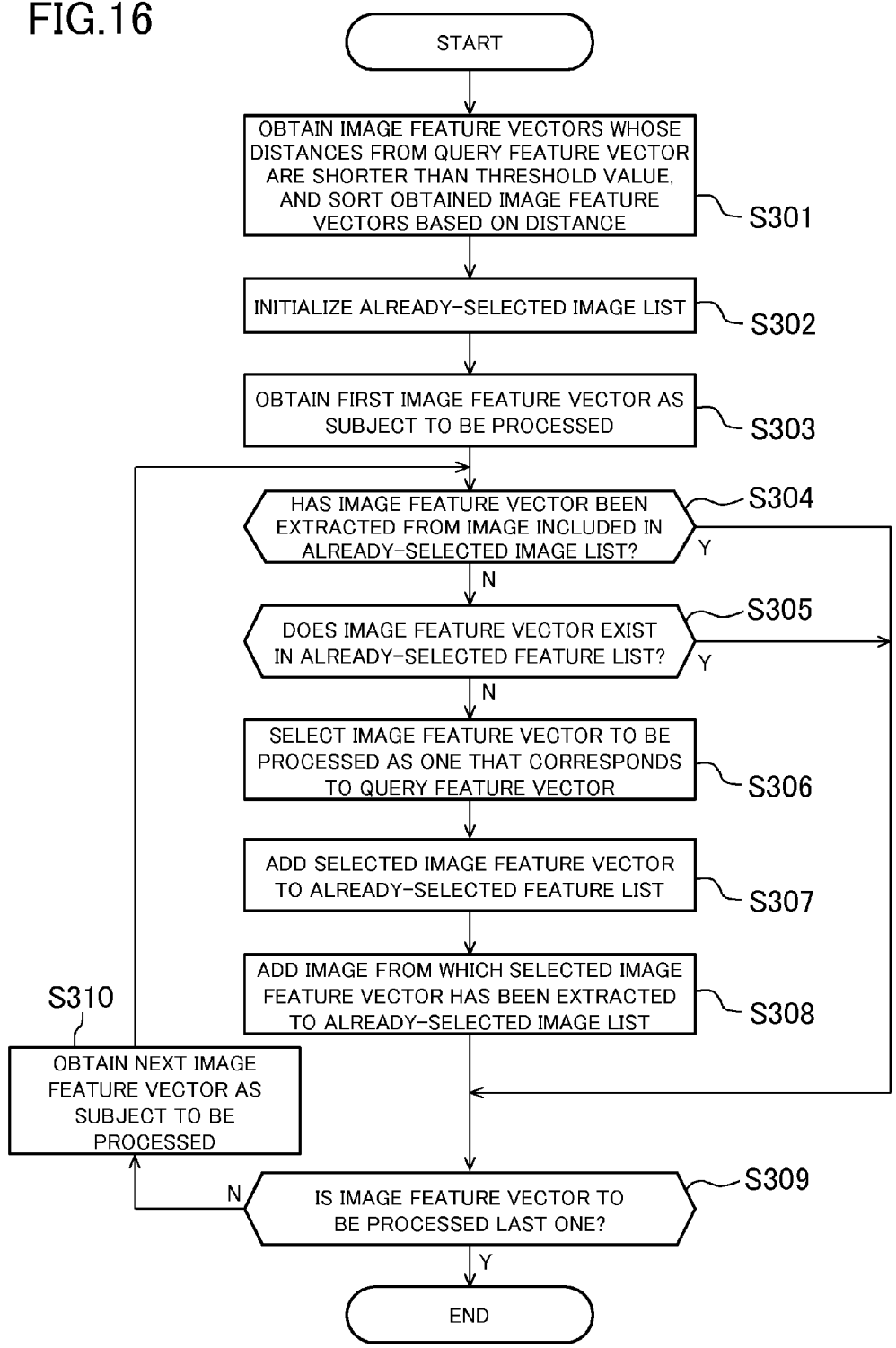
FIG. 16 is a diagram illustrating an example of a processing flow of an image feature vector selecting unit.

FIG. 16 is a diagram illustrating an example of a processing flow of the image feature vector selecting unit 89. The image feature vector selecting unit 89 performs processing illustrated in FIG. 16 for each query feature vector. Further, an already-selected feature list described later is shared among all the query feature vectors with respect to a given query image, and the already-selected feature list is initialized before the processing is performed for the first query feature vector. The following description is made of the processing for a given query feature vector.

First, the image feature vector selecting unit 89 obtains the image feature vectors 22 whose distances from the query feature vector are shorter than a predefined threshold value from among the image feature vectors 22 belonging to the selected cluster, and sorts the obtained image feature vectors 22 based on the distance (Step S301).

Figure 17:
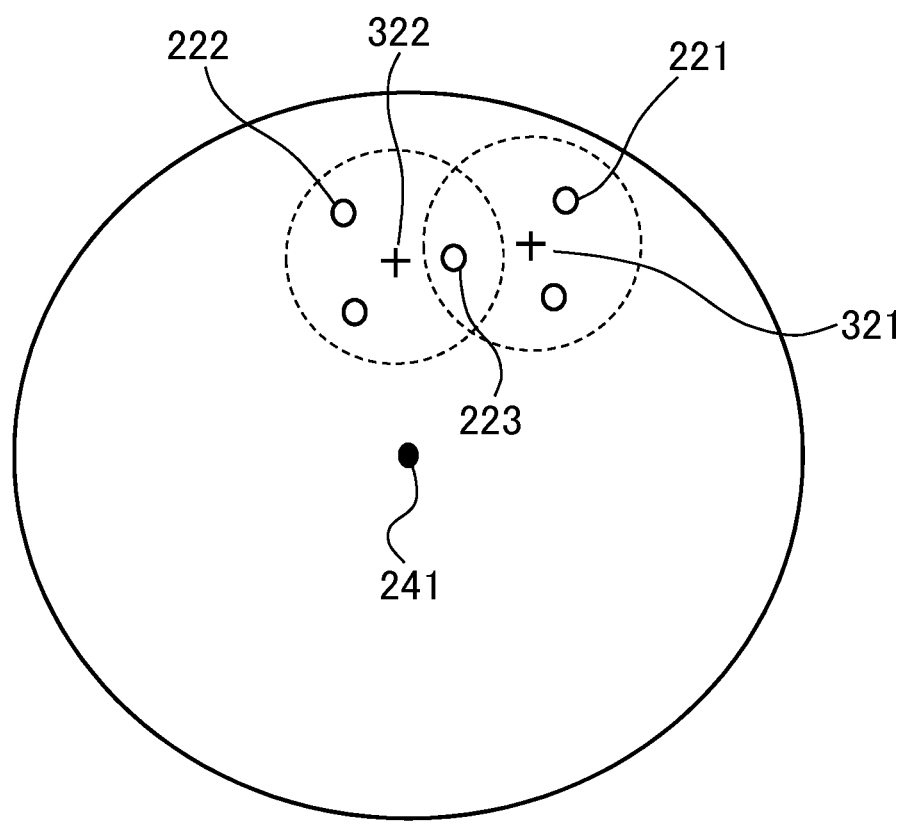
FIG. 17 is a diagram illustrating an example of a case of selecting an image feature vector corresponding to a query feature vector.

FIG. 17 is a diagram illustrating an example of a case of selecting the image feature vector 22 relative to a query feature vector. In FIG. 17, the solid-line circle indicates the selected cluster, the black circle at the center of the solid-line circle indicates a representative vector 241 (precisely, coordinates of the vector) of the cluster, and the white circles indicate the image feature vectors 22 included in the cluster. The plus signs indicate the query feature vectors. In the example of FIG. 17, image feature vectors 221 and 223, which exist within the dotted line around the white circle of the query feature vector 321, and whose distance from a query feature vector 321 is within a range of the threshold value, are obtained with respect to the query feature vector 321, and the obtained image feature vectors 221 and 223 are sorted. Further, image feature vectors 222 and 223 are obtained with respect to a query feature vector 322, and sorted. Here, search accuracy can be controlled by changing the threshold value. Specifically, the smaller threshold value allows the fewer image feature vectors 22 to be output as the search results, while the larger threshold value allows the image feature vector 22 within the wider range to be output as the search results. Note that, all the image feature vectors included in the cluster are selected when the maximum threshold value is set. Note that, a predefined number of query feature vectors may be obtained in ascending order of the distance instead of based on whether or not the distance falls within a range. Note that, in FIG. 17, for an easy understanding, the representative vector of the cluster, the image feature vectors included in the cluster, and the query feature vectors are illustrated by using a two-dimensional drawing, but in actuality, those vectors are not two-dimensional but 128 dimensional.

Subsequently, the image feature vector selecting unit 89 clears and initializes the images belonging to an already-selected image list (Step S302). Subsequently, the image feature vector selecting unit 89 obtains the first image feature vector 22 as a subject to be processed from among the sorted image feature vectors 22 (Step S303). When the image feature vector 22 to be processed has not been extracted from an image included in the already-selected image list (N in Step S304) and does not exist in the already-selected feature list (N in Step S305), the image feature vector selecting unit 89 selects the image feature vector 22 to be processed as one that corresponds to the query feature vector (Step S306). Then, the image feature vector selecting unit 89 adds the selected image feature vector 22 to the already-selected feature list (Step S307), and adds the image from which the selected image feature vector 22 has been extracted to the already-selected image list (Step S308). When the image feature vector 22 to be processed has been extracted from the image included in the already-selected image list (Y in Step S304) or exists in the already-selected feature list (Y in Step S305), the processes of Step S306 to Step S308 are skipped.

When the image feature vector 22 to be processed is the last image feature vector 22 (Y in Step S309), the processing for the query feature vector is finished, and when the image feature vector 22 to be processed is not the last image feature vector 22 (N in Step S309), the image feature vector selecting unit 89 obtains the next image feature vector 22 as a subject to be processed (Step S310), and repeats Step S304 and the subsequent steps.

According to the processes of Step S304 and the like, it is possible to suppress a phenomenon where a plurality of image feature vectors 22 extracted from one image are selected for a given query feature vector. According to the processes of Step S305 and the like, it is possible to suppress a phenomenon where, for example, the image feature vector 223 illustrated in FIG. 17 is selected a plurality of times by the plurality of query feature vectors. In other words, the image feature vectors 22 selected with respect to one query feature vector do not overlap with the image feature vectors 22 selected with respect to another query feature vector. As a result, the query feature vector extracted from the query image and the selected one of the image feature vectors 22 extracted from any one of the images to be searched correspond to each other on a one-to-one basis.

Figure 18:
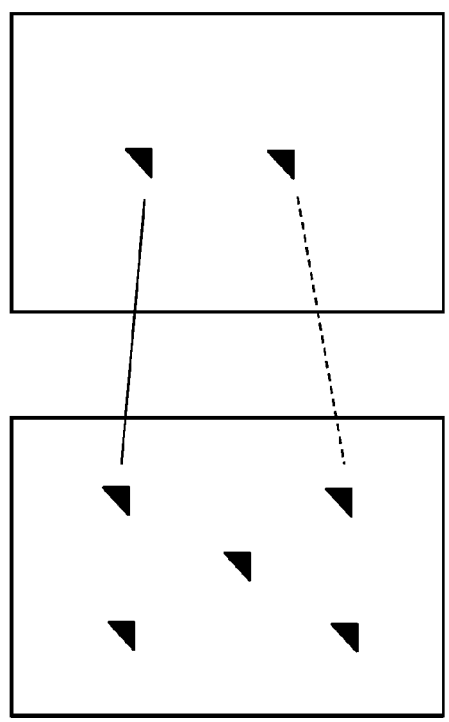
FIG. 18 is a diagram illustrating an example of a correspondence between a local feature within a query image and a local feature within an image to be searched.

FIG. 18 is a diagram illustrating an example of a correspondence between a local feature within a query image (corresponding to the query feature vector) and a local feature within an image to be searched (corresponding to the image feature vector 22). In FIG. 18, the rectangle illustrated on the upper side indicates the query image, and the rectangle illustrated on the lower side indicates the image to be searched. A plurality of triangles included in those images indicate local features similar to one another. In this manner, the local feature within the query image and the local feature within the image to be searched correspond to each other on a one-to-one basis.

Figure 19:
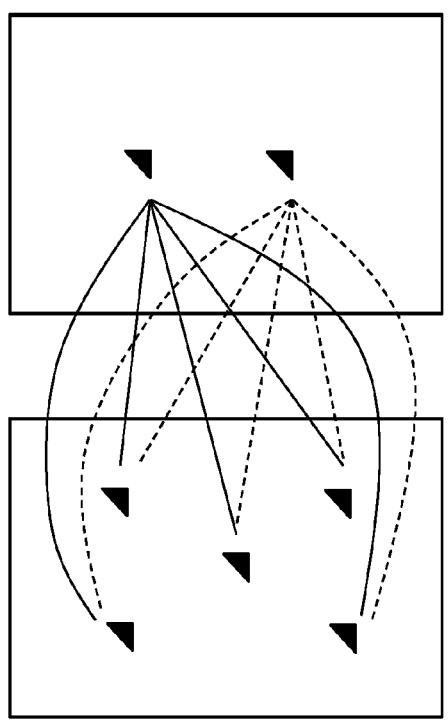
FIG. 19 is a diagram illustrating a comparative example of the correspondence between the local feature within the query image and the local feature within the image to be searched.

FIG. 19 is a diagram illustrating a comparative example of the correspondence between the local feature within the query image and the local feature within the image to be searched. FIG. 19 illustrates an example in which the processes of Step S304 and S305 are not performed. This case relates to a many-to-many correspondence, which dramatically increases the number of selected image feature vectors 22.

As apparent from the comparison between FIG. 18 and FIG. 19, the above-mentioned processing can prevent more image feature vectors 22 having different numbers of local feature amounts than those having the same number from being extracted between the query image and one of the images to be searched. This can reduce, through score generation processing described later, a probability that an image in which the number of local features is greatly different from the number of local features included in the query image may be selected as a search result.

[Generation of Score for Each Image]

When the image feature vector 22 is selected, the image score generating unit 90 included in the image search unit 52 generates a score for each of the images to be searched (Step S105). The image score generating unit 90 is implemented mainly by the parallel computing device 14. The image score generating unit 90 calculates a score element for each of a plurality of images based on the proximities between the selected plurality of image feature vectors 22 indicating the feature of the image and the query feature vector corresponding to the selected image feature vector 22, and generates the image score of the image based on a total sum of the score elements.

The image score generating unit 90 uses the following expression to calculate a score element se for each of the selected image feature vector 22.

$$se = \frac{1}{\ln(dist + e)} \quad \text{[Expression 1]}$$

In this expression, "dist" represents a distance between the image feature vector 22 and the query feature vector corresponding to the image feature vector 22, "ln" represents a natural logarithm, and "e" represents a base of the natural logarithm. With this, the score element se of the image feature vector 22 having a corresponding query feature vector changes in accordance with the distance. Subsequently, for each of the images, the image score generating unit 90 uses a total sum of the score elements s of the image feature vectors 22 extracted from the image and selected by the image feature vector selecting unit 89, to calculate an image score si as in the following expression.

$$si = \frac{\sum se}{\sqrt{kn}} \quad \text{[Expression 2]}$$

In this expression, "kn" represents the number of image feature vectors 22 extracted from the image. The image score si generated by those expressions is a score generated by taking into consideration not only a frequency at which the image feature vector 22 is selected for each of the images but also the proximity between each of the query feature vector and the corresponding image feature vector 22, which can further improve the search accuracy.

Figure 20:
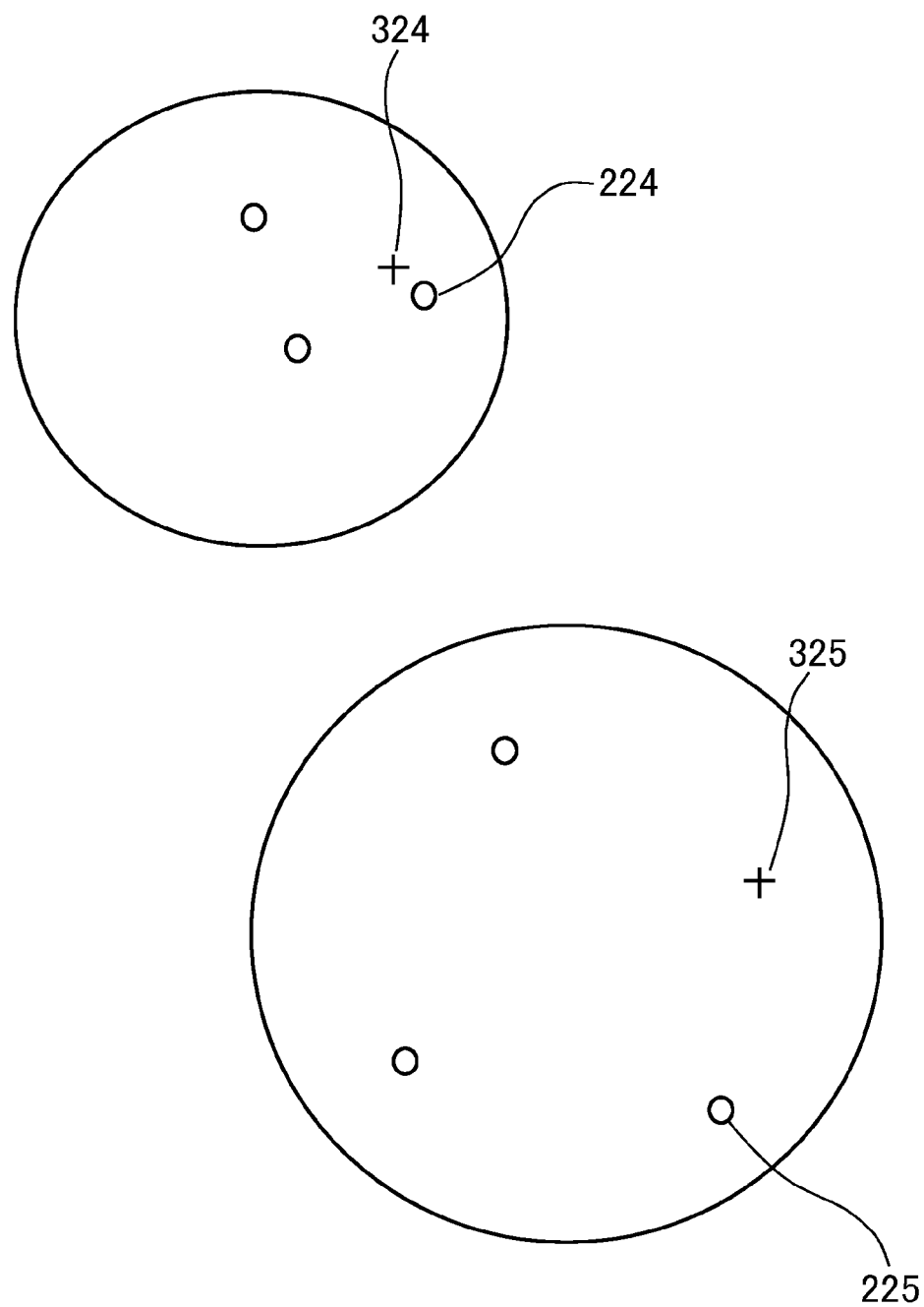
FIG. 20 is a diagram illustrating an example of variation in distance between the query feature vector and the image feature vector.

FIG. 20 is a diagram illustrating an example of variation in distances between the query feature vector and the image feature vectors 22. For example, in a case where, as in FIG. 20, there are an image in which a query feature vector 324 is close to an image feature vector 224 selected with respect thereto and an image in which a query feature vector 325 is close to an image feature vector 225 selected with respect thereto, the scores are calculated therefore with the same weight conventionally, but according to the above-mentioned processing, it is possible to calculate the score on which such a difference is reflected and to perform a search on which similarity in the local feature is further reflected.

[Selection of Image]

When the image score is generated, the search result image selecting unit 91 included in the image search unit 52 selects the image to be the search result (Step S106). The search result image selecting unit 91 is implemented mainly by the parallel computing device 14. The search result image selecting unit 91 selects at least one of the plurality of images to be searched as the search result based on the image score calculated by the image score generating unit 90. Specifically, the search result image selecting unit 91 sorts the image scores in descending order of the value, and selects a certain number of images having the highest image scores, or selects the images having the image scores higher than a predetermined value.

FIG. 21 is a diagram illustrating an example of results of sorting the image scores. When the Turkish flag including one star mark is used as the query image as illustrated in FIG. 21, a phenomenon where the image score rises for an image of the United States' star-spangled banner including a large number of star marks is suppressed. When the image is selected, the search result image selecting unit 91 outputs information on the selected image to the web server 2. The web server 2 outputs the information for displaying the image of the search result to the client device 3.

Note that, the processes of the upper representative vector distance calculating unit 83 to the image feature vector distance calculating unit 88 is highly compatible with the hardware for performing parallel computation such as a GPU, and can make the most of a parallel calculation ability of the GPU. Further, the subsequent processes also allow the parallel processing to some degree, and are capable of performing the processing at higher speed than when the CPU 11 is used. Therefore, it is possible to sufficiently enjoy an effect of shortening a processing time by the GPU. Further, the CPU 11 may execute apart of those processes.

Second Embodiment

Unlike in the first embodiment, an image search system according to a second embodiment of the present invention does not determine the distance between the image feature vector 22 and the query feature vector after the image feature cluster is selected. This method is a search method partially similar to the BoF method. The following description is made mainly of differences from the first embodiment. Note that, the configurations of the devices that form the image search system illustrated in FIG. 1 and points in that the image search device 1 includes the index generating unit 51 and the image search unit 52 are the same as those of the first embodiment.

[Generation of Index]

In the same manner as in the first embodiment, the index generating unit 51 includes the image feature vector extracting unit 61 and the cluster generating unit 62. The image feature vector extracting unit 61 extracts the plurality of image feature vectors 22 from each of the plurality of images to be searched. The cluster generating unit 62 classifies the extracted image feature vectors 22 into a plurality of image feature clusters. Further, the cluster generating unit 62 stores the representative vectors of those image feature clusters into a representative vector storing unit 172, and stores information relating to the image feature vectors 22 belonging to the image feature cluster into a cluster image feature amount storing unit 171. The same method as in the first embodiment may be used for the classification into the image feature clusters. However, the cluster generating unit 62 stores the information corresponding to the index of the image feature vector 22, more specifically, the identification information on the image from which the image feature vectors have been extracted, into the cluster image feature amount storing unit 171 instead of the respective elements of the image feature vectors 22. The cluster image feature amount storing unit 171 and the representative vector storing unit 172 are configured specifically by the storage unit 12.

Figures 22, 23:
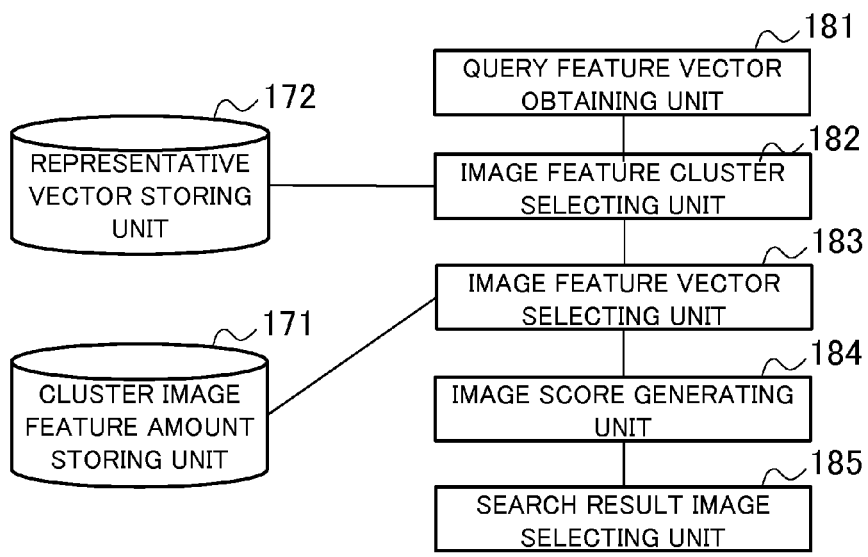
FIG. 22 is a diagram illustrating an example of data stored in a cluster image feature amount storing unit.
FIG. 23 is a functional block diagram illustrating a functional configuration of an image search unit according to a second embodiment.

FIG. 22 is a diagram illustrating an example of data stored in the cluster image feature amount storing unit 171. The cluster image feature amount storing unit 171 stores a plurality of records each having elements including a cluster number serving as identification information on the image feature cluster and an image number serving as identification information on the image. Here, one record corresponds to one image feature vector 22. When a plurality of image feature vectors extracted from a given image exist in the same image feature cluster, the number of records having the same cluster number and the same image number is the number of image feature vectors 22.

[Processing for Searching for and Retrieving Image]

FIG. 23 is a functional block diagram illustrating a functional configuration of the image search unit 52 according to the second embodiment. The image search unit 52 functionally includes a query feature vector obtaining unit 181, an image feature cluster selecting unit 182, an image feature vector selecting unit 183, an image score generating unit 184, and a search result image selecting unit 185.

FIG. 24 is a diagram illustrating an outline of processing of the image search unit 52 according to the second embodiment. The following description is made of the respective functions included in the image search unit 52 with reference to a processing flow illustrated in FIG. 24.

[Obtainment of Query Feature Vector]

The query feature vector obtaining unit 181 is implemented mainly by the CPU 11, the storage unit 12, and the parallel computing device 14. First, the query feature vector obtaining unit 181 obtains one or a plurality of query feature vectors from the query image (Step S1101). This process is the same as the process performed by the query feature vector obtaining unit 82 in the first embodiment.

[Selection of Image Feature Cluster]

The image feature cluster selecting unit 182 is implemented mainly by the CPU 11, the storage unit 12, and the parallel computing device 14. When the query feature vector is obtained, the image feature cluster selecting unit 182 selects the plurality of image feature clusters respectively corresponding to the plurality of query feature vectors (Step S1102). More specifically, the image feature cluster selecting unit 182 selects, with respect to each of the query feature vectors, the image feature cluster having the representative vector that is closest to the query feature vector. As a more detailed calculation method, the distance calculation may be performed by using the CPU 11, or as described in the first embodiment, the image feature cluster may be selected by using the parallel computing device 14 and the tree structure of the representative vector. Note that, it may be assumed that the selected image feature cluster corresponds to a visual word used in the BoF method.

[Selection of Image Feature Vector]

The image feature vector selecting unit 183 is implemented mainly by the CPU 11 and the storage unit 12. The image feature vector selecting unit 183 selects the image feature vector 22 corresponding to each of the query feature vectors from the image feature vectors 22 belonging to the image feature cluster selected with respect to the each of the query feature vectors (Step S1103). Here, the image feature vector selecting unit 89 selects the plurality of image feature vectors 22 that satisfy the following conditions. One condition indicates that, for each of the plurality of images to be searched, the number of image feature vectors 22 selected with respect to one given query feature vector from among the plurality of image feature vectors 22 extracted from the image is one. The other condition indicates that the image feature vector 22 selected with respect to anyone of the query feature vectors does not overlap with the image feature vector 22 selected with respect to another query feature vector. The image feature vector selecting unit 183 selects, for each of the query feature vectors, all the image feature vectors 22 that satisfy the above-mentioned conditions as the image feature vector 22 corresponding to the query feature vector.

As a specific processing method, for example, the process of Step S301 among the processes described in the first embodiment with reference to FIG. 16 may be changed to obtain all the image feature vectors 22 included in the image feature cluster selected with respect to the query feature vector. Note that, in this embodiment, the image feature vector 22 itself is not stored in the cluster image feature amount storing unit 171, and the distance calculation or the sort based on the distance is not performed.

FIG. 25 is a diagram for illustrating a distribution of the image feature vectors 22 within a third image feature cluster and selection made by query feature vectors. FIG. 25 indicates the number of image feature vectors 22 for each of the images within a given image feature cluster (here, image feature cluster having the cluster number of "3"). In FIG. 25, the horizontal axis indicates the image number, and the vertical axis indicates the number of image feature vectors 22. When the image feature cluster having the cluster number "3" is selected by a given query feature vector for the first time, one image feature vector 22 extracted from each of the images having the image numbers "3", "4", "5", "7", and "16" is selected. Further, when the image feature cluster having the cluster number "3" is selected by another query feature vector for the second time, one image feature vector 22 extracted from each of the images having the image numbers "4" and "16" is selected from among the remaining image feature vectors 22.

[Generation of Score for Each Image]

The image score generating unit 184 is implemented mainly by the CPU 11 and the storage unit 12. The image score generating unit 184 generates, for each of at least apart of the plurality of images, the image score of the image based on an appearance frequency of the selected image feature vector 22 within the corresponding image (Step S1104). For example, the image score generating unit 184 generates, for each of the images, the image score by counting the number of image feature vectors 22 extracted from the image and selected with respect to the query feature vector.

[Selection of Image]

The search result image selecting unit 185 is implemented mainly by the CPU 11 and the storage unit 12. The search result image selecting unit 185 selects the image to be the search result (Step S1105). Specifically, in the same manner as in the search result image selecting unit 91 in the first embodiment, the search result image selecting unit 185 selects at least one of the plurality of images to be searched based on the image score as the search result.

As described above, even when the distance between the image feature vector 22 and the query feature vector is not calculated after the image feature cluster is selected, such an effect occurs that the query feature vectors extracted from the query image are associated with the image feature vector 22 selected from among the image feature vectors 22 extracted from any one of the images to be searched on a one-to-one basis, and the probability that the image in which the number of local features included is greatly different from the number of local features included in the query image may be selected as the search result is suppressed.

Third Embodiment

As in the second embodiment, an image search system according to a third embodiment of the present invention does not determine the distance between the image feature vector 22 and the query feature vector after the image feature cluster is selected. In this embodiment, the same effect as that of the second embodiment is obtained by using such an existing full-text search engine as used in the BoF method. The following description is made mainly of differences from the second embodiment. Note that, the configurations of the devices that form the image search system illustrated in FIG. 1 and the functional configurations illustrated in FIG. 2 and FIG. 23 are the same as those of the second embodiment.

[Generation of Index]

In the third embodiment, the cluster generating unit 62 stores a transposed matrix generally used in the BoF method into the cluster image feature amount storing unit 171. The transposed matrix used in the BoF method represents a matrix formed of a column corresponding to the image and a row corresponding to the visual word. In this embodiment, a character string that identifies the row of the matrix is referred to as "visual word identifier". Here, the visual word identifier is obtained by appending information to an identification number of the image feature cluster corresponding to the visual word. The information indicates an order position of the image feature vector 22 corresponding to a given image in the image feature cluster relevant to extracting the image feature vector 22.

FIG. 26 is a diagram illustrating an example of the transposed matrix used to generate the image score. The visual word identifier that is not hyphenated is the same as a cluster number of the image feature cluster. When "1" is in a cell defined by the row of the visual word and the column of a given image number, there exists the first image feature vector 22 that is extracted from the image indicated by the image number and belongs to the image feature cluster. Further, in regard to the visual word identifier that is hyphenated, the number before the hyphen indicates the cluster number of the image feature cluster, and the number after the hyphen indicates a sequential number of the image feature vector 22 within the image. For example, when "1" is in a cell defined by the row having the visual word identifier "3-2" and the column having the image number "4", the second image feature vector 22 within the fourth image exists in the third image feature cluster. The cell in which "1" exists corresponds to the image feature vector 22. It should be understood that a hyphen does not need to be used for expression of the visual word identifier. The visual word identifier may be expressed in any form as long as the image feature vectors 22 belonging to the same cluster and extracted from the same image can be identified.

Further, "many" within the visual word identifier "3-many" indicates a predefined in-cluster threshold value (here, "3") and the subsequent sequential numbers. When "1" is in a cell defined by the row having the visual word identifier "3-many" and the column having the image number "4", the image feature vectors 22 in a predetermined order position (third) and the subsequent order positions exist in the third image feature cluster. In this embodiment, "3-4" and the subsequent visual words are not allowed to exist. This indicates that the information on the fourth image feature vector 22 and the subsequent image feature vectors 22 is deleted. Further, this is equivalent to that the number of image feature amounts corresponding to any one of the plurality of images to be searched among the image feature vectors 22 belonging to a given image feature cluster does not exceed the in-cluster threshold value. The cluster generating unit 62 deletes the image feature vector 22 that exceeds the in-cluster threshold value among the image feature vectors 22 belonging to a given image feature cluster and corresponding to anyone of the plurality of images to be searched from the image feature cluster, and stores a result thereof into the cluster image feature amount storing unit 171.

[Processing for Searching for and Retrieving Image]

FIG. 27 is a diagram illustrating an outline of processing of the image search unit 52 according to the third embodiment. The following description is made mainly of differences from the second embodiment with reference to a processing flow illustrated in FIG. 27.

First, the query feature vector obtaining unit 181 obtains one or a plurality of query feature vectors from the query image (Step S2101). Subsequently, the image feature cluster selecting unit 182 selects the plurality of image feature clusters respectively corresponding to the plurality of query feature vectors (Step S2102). Those processes are the same as those of the second embodiment, and hence a description thereof is omitted.

Subsequently, the image feature vector selecting unit 183 generates the visual word identifier based on the cluster number of the selected image feature cluster and an order position in which the image feature cluster is selected (Step S2103). This creation rule is the same as a generation rule for the visual word identifier in the transposed matrix. Specifically, the cluster number of the image feature cluster is set as the visual word identifier when the order position in which the image feature cluster is selected is "1", the cluster number to which the hyphen and the order position are added is set as the visual word identifier when the order position is "2" to "(feature threshold value)−1", and the cluster number to which "-many" is added is set as the visual word identifier when the order position is the feature threshold value.

Subsequently, the image feature vector selecting unit 183 selects the image feature vector 22 corresponding to the visual word identifier by using the transposed matrix (Step S2104). The selection of the image feature vector 22 is performed specifically by obtaining the cell containing "1" and the image number of the cell. Further, the image feature vector selecting unit 183 generates the score of the image by using the selected image number and a numerical value within the cell (Step S2105). Then, the image feature vector selecting unit 183 selects the image to be the search result based on the score (Step S2106).

The processes of Step S2104 to Step S2106 may be performed by a known full-text search engine. Examples of this processing engine include "Solr". By the creation of the above-mentioned transposed matrix, the value within the cell selected from a given image relative to a given query feature vector is limited to "1". Accordingly, the query feature vectors extracted from the query image can be associated with the image feature vectors 22 selected for a given image on a one-to-one basis. This produces an effect of suppressing a probability that the image in which the number of local features is greatly different from the number of local features included in the query image may be selected as the search result.

The invention claimed is:

1. An image search device, comprising:
   a plurality of parallel processors each of which includes a register and which execute a same instruction;
   a common memory which is commonly and directly accessible from the plurality of parallel processors,
   wherein each element of a vector stored in common memory are loaded, at one time, into the register of a corresponding one of the plurality of parallel processors in bulk, and each of the plurality of parallel processors processes the loaded element of the vector;
   a storage unit storing a plurality of image feature vectors that respectively indicate a plurality of local features of each of a plurality of search target images to be searched and respectively belong to one of a plurality of clusters, and a plurality of representative feature vectors each of which represents one of the plurality of clusters, in which more than one of the image feature vectors are extracted from one of the plurality of images;

representative vector transfer means for transferring the plurality of the representative feature vectors from the storage unit to the common memory;

query feature obtaining means for obtaining and storing, in the common memory, a plurality of query feature vectors which are created from one image serving as a query, each query feature vector indicating a local feature of the image serving as the query;

first distance calculating means for calculating a first distance between at least a part of the plurality of transferred representative feature vectors and each of the query feature vectors using the plurality of parallel processors;

cluster selecting means for selecting a cluster from the plurality of clusters based on the calculated first distance;

second distance calculating means for calculating a second distance between the query feature vector and the plurality of image feature vectors which belong to the selected cluster using the plurality of parallel processors;

image feature vector selecting means for selecting, for each of the plurality of query feature vectors, an image feature vector from the plurality of image feature vectors based on the calculated second distance, where, for any one of plurality of the query feature vectors, a selected image feature vector is not selected relative to other query feature vectors within the plurality of query feature vectors;

score generating means for generating an image score of the search target image based on a total sum of score elements each score element depending on proximities between the selected plurality of image feature vectors each indicating a feature of any one of the plurality of search target images and the query feature vectors corresponding to the selected image feature vectors; and image selecting means for selecting at least one of the plurality of search target images to be searched based on the image score.

2. The image search device according to claim 1, wherein the image feature vector selecting means selects, for each of the plurality of query feature vectors, an image feature vector whose distance from the plurality of query feature vectors is smaller than a predetermined threshold value from among a plurality of image feature vectors which respectively indicate a plurality of local features of each of a plurality of search target images to be searched and which are stored in the storage unit in advance.

3. The image search device according to claim 2, wherein the image feature vector selecting means selects, for each of the plurality of query feature vectors, not more than one image feature vector is from among a plurality of image feature vectors which respectively indicate a plurality of local features of each of a plurality of search target images to be searched and which are stored in the storage unit in advance.

4. The image search device according to claim 3,
wherein a cluster corresponding to each of the plurality of query feature vectors is selected from a plurality of clusters into which the plurality of image feature vectors stored in the storage unit are classified,
wherein, in the image feature vector selection, the image feature vector is selected for each of the plurality of query feature vectors from the image feature vectors belonging to the selected cluster.

5. The image search device according to claim 2, further comprising:
wherein a cluster corresponding to each of the plurality of query feature vectors is selected from a plurality of clusters into which the plurality of image feature vectors stored in the storage unit are classified,
wherein, in the image feature vector selection, the image feature vector is selected for each of the plurality of query feature vectors from the image feature vectors belonging to the selected cluster.

6. The image search device according to claim 2, wherein the proximity between the selected image feature vectors and the query feature vector corresponding to the selected image feature vector is a distance between the selected image feature vectors and the query feature vector.

7. The image search device according to claim 1, wherein the image feature vector selecting means selects, for each of the plurality of query feature vectors, an image feature vector of which a number is predetermined in ascending order of distance from among a plurality of image feature vectors which respectively indicate a plurality of local features of each of a plurality of search target images to be searched and which are stored in the storage unit in advance.

8. The image search device according to claim 7, wherein the image feature vector selecting means selects, for each of the plurality of query feature vectors, not more than one image feature vector from among a plurality of image feature vectors which respectively indicate a plurality of local features of each of a plurality of search target images to be searched and which are stored in the storage unit in advance.

9. The image search device according to claim 8,
wherein a cluster corresponding to each of the plurality of query feature vectors is selected from a plurality of clusters into which the plurality of image feature vectors stored in the storage unit are classified,
wherein, in the image feature vector selection, the image feature vector is selected for each of the plurality of query feature vectors from the image feature vectors belonging to the selected cluster.

10. The image search device according to claim 7,
wherein a cluster corresponding to each of the plurality of query feature vectors is selected from a plurality of clusters into which the plurality of image feature vectors stored in the storage unit are classified,
wherein, in the image feature vector selection, the image feature vector is selected for each of the plurality of query feature vectors from the image feature vectors belonging to the selected cluster.

11. The image search device according to claim 7, wherein the proximity between the selected image feature vectors and the query feature vector corresponding to the selected image feature vector is a distance between the selected image feature vectors and the query feature vector.

12. The image search device according to claim 1, wherein the image feature vector selecting means selects, for each of the plurality of query feature vectors, not more than one image feature vector from among a plurality of image feature vectors which respectively indicate a plurality of local features of each of a plurality of search target images to be searched and which are stored in the storage unit in advance.

13. The image search device according to claim 12,
wherein a cluster corresponding to each of the plurality of query feature vectors is selected from a plurality of clusters into which the plurality of image feature vectors stored in the storage unit are classified,
wherein, in the image feature vector selection, the image feature vector is selected for each of the plurality of query feature vectors from the image feature vectors belonging to the selected cluster.

14. The image search device according to claim 12, wherein the proximity between the selected image feature vectors and the query feature vector corresponding to the selected image feature vector is a distance between the selected image feature vectors and the query feature vector.

15. The image search device according to claim 1,
wherein a cluster corresponding to each of the plurality of query feature vectors is selected from a plurality of clusters into which the plurality of image feature vectors stored in the storage unit are classified,
wherein, in the image feature vector selection, the image feature vector is selected for each of the plurality of query feature vectors from the image feature vectors belonging to the selected cluster.

16. The image search device according to claim 15, wherein the proximity between the selected image feature vectors and the query feature vector corresponding to the selected image feature vector is a distance between the selected image feature vectors and the query feature vector.

17. The image search device according to claim 1, wherein the proximity between the selected image feature vectors and the query feature vector corresponding to the selected image feature vector is a distance between the selected image feature vectors and the query feature vector.

18. An image search method, which uses
a plurality of parallel processors each of which includes a register and which execute a same instruction;
a common memory which is commonly and directly accessible from the plurality of parallel processors,
wherein each element of a vector stored in common memory are loaded, at one time, into the register of a corresponding one of the plurality of parallel processors in bulk, and each of the plurality of parallel processors processes the loaded element of the vector;
a storage unit storing a plurality of image feature vectors that respectively indicate a plurality of local features of each of a plurality of search target images to be searched and respectively belong to one of a plurality of clusters, and a plurality of representative feature vectors each of which represents one of the plurality of clusters, in which more than one of the image feature vectors are extracted from one of the plurality of images;
representative vector transfer means for transferring the plurality of the representative feature vectors from the storage unit to the common memory;
said method comprising:
obtaining and storing, in a common memory, a plurality of query feature vectors which are created from one image serving as a query, each query feature vector indicating a local feature of the image serving as the query;
calculating a first distance between at least a part of the plurality of transferred representative feature vectors and each of the query feature vectors using the plurality of parallel processors;
selecting a cluster from the plurality of clusters based on the calculated first distance;
calculating a second distance between the query feature vector and the plurality of image feature vectors which belong to the selected cluster using the plurality of parallel processors;

selecting, for each of the plurality of query feature vectors, an image feature vector from the plurality of image feature vectors based on the calculated second distance, where, for any one of plurality of the query feature vectors, a selected image feature vector is not selected relative to other query feature vectors within the plurality of query feature vectors;
generating an image score of the search target image based on a total sum of score elements each depending on proximities between the selected plurality of image feature vectors each indicating a feature of any one of the plurality of search target images and the query feature vectors corresponding to the selected image feature vectors; and
selecting at least one of the plurality of search target images to be searched based on the image score.

19. A computer-readable non-transitory storage medium having stored thereon a program for causing hardware comprising:
a plurality of parallel processors, each of which includes a register and which execute a same instruction:
a common memory, which is commonly and directly accessible from the plurality of parallel processors, wherein each element of a vector stored in common memory are loaded, at one time, into the register of a corresponding one of the plurality of parallel processors in bulk, and each of the plurality of parallel processors processes the loaded element of the vector;
a storage unit, storing a plurality of image feature vectors that respectively indicate a plurality of local features of each of a plurality of search target images to be searched and respectively belong to one of a plurality of clusters, and a plurality of representative feature vectors each of which represents one of the plurality of clusters, in which one more than one of the image feature vectors are extracted from one of the plurality of images;
said computer readable non-transitory storage medium causing said hardware to:
transfer the plurality of the representative feature vectors from the storage unit to the common memory;
obtain and store, in common memory, a plurality of query feature vectors which are created from one image serving as a query, each query feature vector indicating a local feature of an image serving as a query;
calculate a first distance between at least a part of the plurality of transferred representative feature vectors and each of the query feature vectors using the plurality of parallel processors;
select a cluster from the plurality of clusters based on the calculated first distance;
calculate a second distance between the query feature vector and the plurality of image feature vectors which belong to the selected cluster using the plurality of parallel processors;
select, for each of the plurality of query feature vectors, an image feature vector from the plurality of image feature vectors based on the calculated second distance, where, for any one of plurality of the query feature vectors, a selected image feature vector is not selected relative to other query feature vectors within the plurality of query feature vectors;
generate an image score of the search target image based on a total sum of score elements each score element depending on proximities between the selected plurality of image feature vectors and the query feature vectors corresponding to the selected image feature vectors; and select at least one of the plurality of search target images to be searched based on the image score.

\* \* \* \* \*